(12) United States Patent
Takagi et al.

(10) Patent No.: US 7,706,408 B2
(45) Date of Patent: Apr. 27, 2010

(54) COMMUNICATION APPARATUS, COMMUNICATION METHOD, AND COMMUNICATION SYSTEM

(75) Inventors: Masahiro Takagi, Tokyo (JP); Yasuyuki Nishibayashi, Kawasaki (JP); Yoriko Utsunomiya, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 404 days.

(21) Appl. No.: 11/527,528

(22) Filed: Sep. 27, 2006

(65) Prior Publication Data

US 2007/0064738 A1 Mar. 22, 2007

Related U.S. Application Data

(62) Division of application No. 11/029,544, filed on Jan. 6, 2005, now Pat. No. 7,496,076.

(30) Foreign Application Priority Data

Jan. 9, 2004 (JP) ................................. 2004-4847

(51) Int. Cl.
*H04J 3/24* (2006.01)
(52) U.S. Cl. ...................... 370/473; 370/535
(58) Field of Classification Search ................. 370/473, 370/535, 395.1, 469
See application file for complete search history.

(56) References Cited

U.S. PATENT DOCUMENTS

| 5,329,531 | A | 7/1994 | Diepstraten et al. |
| 6,671,284 | B1 * | 12/2003 | Yonge et al. ................. 370/462 |
| 7,352,770 | B1 | 4/2008 | Yonge, III et al. |
| 7,590,118 | B2 * | 9/2009 | Giesberts et al. ............ 370/392 |
| 2003/0103521 | A1 | 6/2003 | Raphaeli et al. |
| 2003/0135640 | A1 | 7/2003 | Ho et al. |
| 2003/0169769 | A1 * | 9/2003 | Ho et al. ...................... 370/473 |
| 2004/0013127 | A1 | 1/2004 | Shvodian |
| 2004/0141522 | A1 | 7/2004 | Texerman et al. |
| 2004/0145530 | A1 | 7/2004 | Foore et al. |
| 2004/0170194 | A1 | 9/2004 | Moreton |

(Continued)

FOREIGN PATENT DOCUMENTS

EP 1 178 630 A1 2/2002

(Continued)

OTHER PUBLICATIONS

European Search Report, dated May 3, 2005, issued in European Application No. 05250024.6-2416.

(Continued)

*Primary Examiner*—Jayanti K Patel
*Assistant Examiner*—Bo Hui A Zhu
(74) *Attorney, Agent, or Firm*—Finnegan, Henderson, Farabow, Garrett & Dunner, LLP

(57) ABSTRACT

A physical frame is constructed, the physical frame including a medium access control super-frame payload which in turn includes a plurality of medium access control frames. With respect to the constructed physical frame, virtual carrier sense information is set in the plurality of medium access control frame so that a result of carrier sense is identical to another by virtual carrier sense based on the plurality of medium access control frames in the medium access control super-frame payload. The physical frame in which the virtual carrier sense information has been set is transmitted to a destined communication apparatus.

17 Claims, 19 Drawing Sheets

U.S. PATENT DOCUMENTS

| | | | |
|---|---|---|---|
| 2005/0124294 | A1 | 6/2005 | Wentink |
| 2005/0152359 | A1 | 7/2005 | Giesberts et al. |
| 2005/0249183 | A1 | 11/2005 | Danon et al. |
| 2005/0265302 | A1* | 12/2005 | Nishibayashi et al. ....... 370/349 |
| 2006/0050730 | A1 | 3/2006 | Shvodian |
| 2006/0140172 | A1 | 6/2006 | Trainin |
| 2007/0115907 | A1 | 5/2007 | Myles et al. |
| 2008/0019343 | A1 | 1/2008 | Benveniste |

FOREIGN PATENT DOCUMENTS

| | | |
|---|---|---|
| JP | 2003-324445 | 11/2003 |
| JP | 2005-057373 | 3/2005 |
| JP | 2005-184839 | 7/2005 |
| WO | WO 03/061196 A2 | 7/2003 |
| WO | WO 2004/112324 A1 | 12/2004 |

OTHER PUBLICATIONS

Part 11: Wireless LAN Medium Access Control (MAC) and Physical Layer (PHY) Specifications, IEEE Standard for Information Technology (Jun. 12, 2003), XP-002325244.

Notice of Reasons for Rejection mailed Apr. 21, 2009, in Japanese Application No. 2006-185879, including English translation (7 pages total).

Lorchat et al., "Energy Saving in IEEE 802.11 Communications using Frame Aggregation," Global Telecommunications Conference, 2003 GLOBECOM '03 IEEE, Dec. 1-5, 2003, vol. 3, pp. 1296-1300 (5 pages total).

Final Notice of Rejection mailed Aug. 18, 2009, in Japanese Patent application No. 2006-185879, and English language translation thereof (4 pages).

European Examination report dated Aug. 31, 2009, in related application European Application No. 07010669.5 (4 pages).

European Search Report and Communication dated Jul. 31, 2007, issued in European Application No. 07010669.5-2416 (8 pages).

IEEE: "Draft Amendment to Standard for Information Technology," IEEE P802.11e/D6.0, Nov. 2003 (175 pages).

Mangold et al., "Analysis of IEEE 802.11e for QoS Support in Wireless LANs," IEEE Wireless Communications, Dec. 2003, pp. 40-50 (11 pages).

Office Action issued from European Patent Office dated Aug. 22, 2006, in European Application No. 05250024.6-2416 (3 pages).

Tourrilhes, "Packet Frame Grouping: Improving IP multimedia performance over CSMA/CA," IEEE 1998 International Conference, Florence, Italy, Oct. 5-9, 1998, vol. 2, Oct. 5, 1998, pp. 1345-1349 (5 pages).

Boer et al, "Backwards Compatibility; How to make a MIMO-OFDM system backwards compatible and coexistence with 11a/g at the link level", IEEE 802.11-03/714 (Sep. 2003), 26 pages.

* cited by examiner

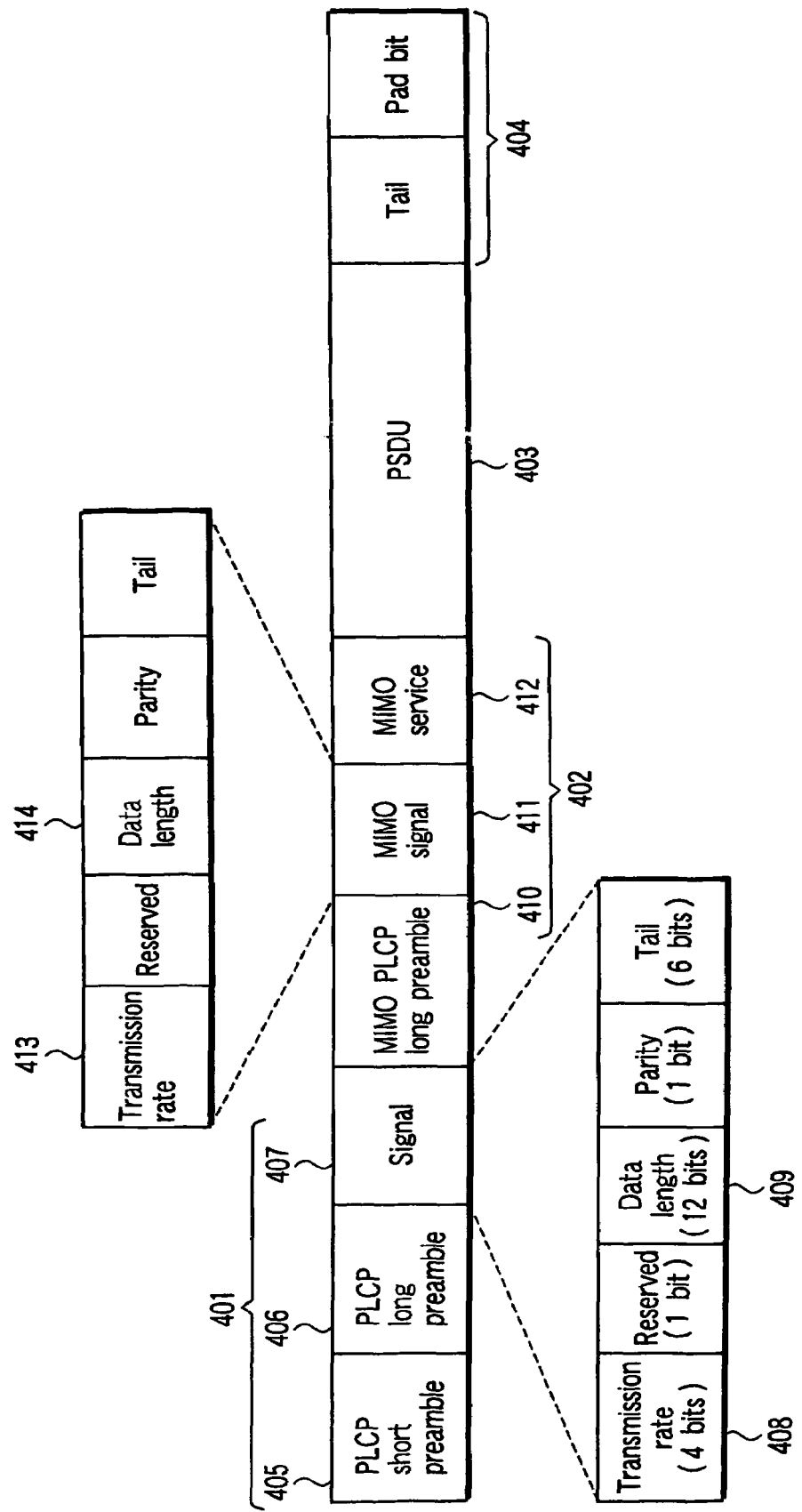
F I G. 4

| Seq. No. | W_all | W1 | TX1 | RX1 | W2 | TX2 | RX2 | W3 | TX3 | RX3 | W4 | TX4 | RX4 | W5 | TX5 | RX5 |
|---|---|---|---|---|---|---|---|---|---|---|---|---|---|---|---|---|
| 1 | Start point | Start point | Len1 | O | | | | | | | | | | | | |
| 2 | | | Len2 | O | | | | | | | | | | | | |
| 3 | | | Len3 | X | Start point | Len3 | O | | | | | | | | | |
| 4 | | | Len4 | O | | Zero | O | | | | | | | | | |
| 5 | | | Len5 | X | | Len5 | O | | | | | | | | | |
| 6 | | | Len6 | O | | Zero | O | | | | | | | | | |
| 7 | | | Len7 | O | | Zero | O | | | | | | | | | |
| 8 | | End point | Len8 | O | | Zero | O | | | | | | | | | |
| 9 | | | | | | Len9 | O | | | | | | | | | |
| 10 | | | | | End point | Len10 | X | Start point | Len10 | O | | | | | | |
| 11 | | | | | | | | | Len11 | O | | | | | | |
| 12 | | | | | | | | | Len12 | O | | | | | | |
| 13 | | | | | | | | | Len13 | X | Start point | Len13 | O | | | |
| 14 | | | | | | | | | Len14 | O | | Zero | O | | | |
| 15 | | | | | | | | | Len15 | X | | Len15 | O | Start point | Len15 | X |
| 16 | End point | | | | | | | End point | Len16 | O | End point | Zero | O | End point | Zero | O |

FIG. 11

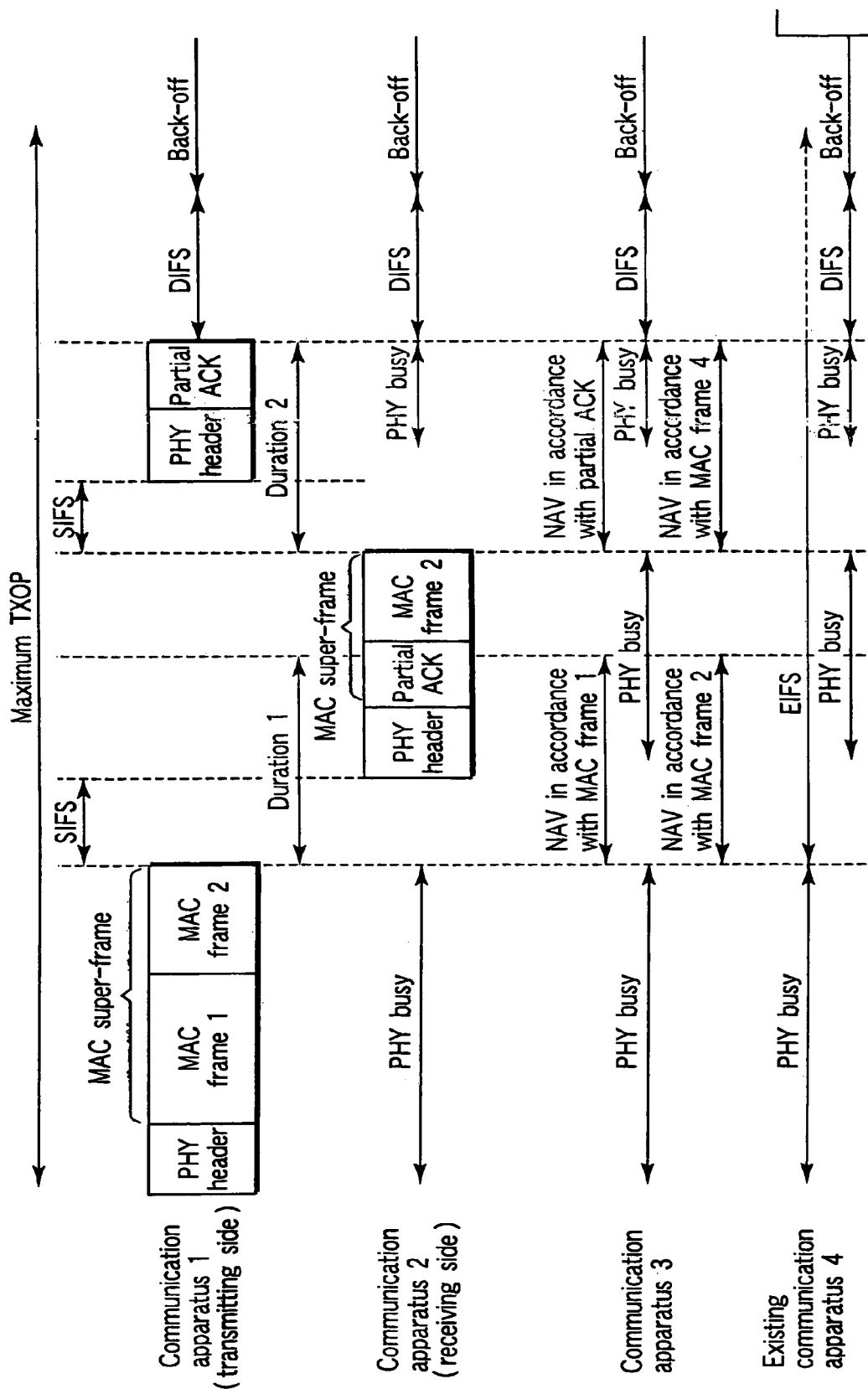
F I G. 17

| MAC frame length 1 | Fragment number | ⎫ |
| --- | --- | --- |
| MAC frame length 2 | Fragment number | ⎬ MSDU1 |
| MAC frame length 3 | Fragment number |  |
| MAC frame length 4 | Fragment number | ⎭ |
| MAC frame length 5 | Fragment number | ⎫ |
| MAC frame length 6 | Fragment number | ⎬ MSDU2 |
| MAC frame length 7 | Fragment number |  |
| MAC frame length 8 | Fragment number | ⎭ |
| MAC frame length 9 | Fragment number | ⎫ |
| MAC frame length 10 | Fragment number | ⎬ MSDU3 |
| MAC frame length 11 | Fragment number |  |
| MAC frame length 12 | Fragment number | ⎭ |
| MAC frame length 13 | Fragment number | ⎫ MSDU4 |
| MAC frame length 14 | Fragment number | ⎭ |
| MAC frame length 15 | Fragment number | ⎫ MSDU5 |
| MAC frame length 16 | Fragment number | ⎭ |
| HCS | | |

FIG. 18

COMMUNICATION APPARATUS, COMMUNICATION METHOD, AND COMMUNICATION SYSTEM

CROSS-REFERENCE TO RELATED APPLICATIONS

This is a Divisional of application Ser. No. 11/029,544, filed Jan. 6. 2005, now U.S. Pat. No. 7,496,076 which is incorporated in its entirety herein by reference. This application is also based upon and claims the benefit of priority from the prior Japanese Patent Application No. 2004-004847, filed Jan. 9, 2004, the entire contents of which are incorporated herein by reference.

BACKGROUND OF THE INVENTION

1. Field of the Invention

The present invention relates to a communication apparatus, a communication method, and a communication system for making a media access control based on carrier sense information contained in a physical layer and carrier sense information contained in a MAC layer.

2. Description of the Related Art

A Media Access Control (MAC) is to determine how a plurality of communication apparatuses making communication by sharing the same media utilize media to transmit communication data. In the case where two or more communication apparatuses transmit communication data by utilizing the same media at the same time, there can occur an event (collision) that a receiving communication apparatus cannot isolate communication data. On the other hand, although a communication apparatus having a transmitting request exists, there can occur an event that a medium is not utilized by any communication apparatus. In order to minimize such events, a media access control technique is used to control an access from a communication apparatus to a medium.

However, in particular, in wireless communication, it is difficult to monitor transmission data at the same time when a communication apparatus transmits data. Therefore, a media access control (MAC) which does not presume detection of collision is required. IEEE 802.11 which is a typical technical standard of a wireless LAN uses a CSMA/CA (Carrier Sense Multiple Access with Collision Avoidance). In the CSMA/CA of the IEEE 802.11, at a heater of a MAC frame, a Duration is set until a series of sequences consisting of exchange of one or more frames that follow the frame have terminated. In this duration, a communication apparatus which does not relates to the sequences and which does not have a transmission privilege determines a virtual occupancy state of a medium, thereby waiting for transmission. Therefore, an occurrence of a collision is avoided. On the other hand, a communication apparatus having a transmission privilege using the sequences recognizes that no media is used to expect a duration in which a physical medium is actually occupied. The IEEE 802.11 defines that a media access is controlled by determining a state of a medium in accordance with a combination between a virtual carrier sense in such a MAC layer and a physical carrier sense in a physical layer.

Up to now, the IEEE 802.11 using the CAMA/CA has promoted a higher communication speed by mainly changing a physical layer protocol. With respect to a 2.4 GHz bandwidth, the IEEE 802.11 (1997, 2 Mbps) is changed to an IEEE 802.11b (1999, 11 Mbps), and the IEEE 802.1b is changed to an IEEE 802.11g (2003, 54 Mbps). With respect to a 5 GHz bandwidth, only an IEEE 802.11a (1999, 54 Mbps) is now provided as standard. In order to define a standard for a higher processing speed in both of the 2.4 GHz bandwidth and the 5 GHz bandwidth, an IEEE 802.11 TGn (Task Group n) has already been established.

If a frequency spectrum identical to that in the existing standard is used in achievement of a higher communication speed, a communication apparatus newly provided enables coexistence with a communication apparatus that follows the existing standard. It is preferable that backward compatibility be maintained. Therefore, it is considered to be basically good that a protocol of a MAC layer follows the CSMA/CA which matches the existing standard. In this case, it is necessary to ensure that a time-related parameter associated with the existing standard, for example, an interframe time interval (IPS: Interframe Space) or a back-off duration conforms to the existing standard.

Here, even if a higher data rate has been successfully achieved with respect to a physical layer, there is a problem that a substantial communication throughput cannot be improved. That is, in the case where a higher data rate of the physical layer has been achieved, a format of a PHY frame is no longer effective. It is considered that an overhead caused by this problem inhibits improvement of throughput. In the PHY frame, a time-related parameter according to the CSMA/CA is fixedly associated with the MAC frame. In addition, a PHY frame header is required for each MAC frame.

One method for reducing an overhead to improve a throughput includes Block ACK introduced in the latest draft IEEE 802.11e draft 5.0 (strengthening QoS of the IEEE 802.11). By using this method, a plurality of MAC frames can be continuously transmitted without back-off. Thus, an amount of back-off can be reduced, but a header of a physical layer cannot be reduced. In addition, according to an aggregation introduced in accordance with an earlier draft IEEE 802.11e, both an amount of back-off and a physical layer header can be reduced. However, a length of a frame of a physical layer including the MAC frame cannot be set to about 4 Kbytes or more because of a restriction on a conventional physical layer. Therefore, large restriction applies to improvement of efficiency. Even if a frame of a physical layer can be increased in length, there occurs a problem that error tolerance is lowered.

BRIEF SUMMARY OF THE INVENTION

The present invention is directed to provide a communication apparatus, a communication method, and a communication system which enable coexistence of an existing apparatus, and which can eliminate an overhead due to transmission of a plurality of frames by efficient use of a frame format and can improve a substantial communication throughput.

A communication apparatus according to an aspect of the present invention comprises: a physical frame construction device configured to construct a physical frame having a medium access super-frame payload which includes a plurality of medium access control frames; a first setting device configured, with respect to the physical frame constructed by the physical frame construction device, to set virtual carrier sense information in the plurality of medium access control frames so that a result of the carrier sense is identical to another even by a virtual carrier sense based on the plurality of medium access control frames in the medium access control super-frame payload; and a transmission device configured to transmit a physical frame in which virtual carrier sense information has been set by the first setting device to a destined communication apparatus.

BRIEF DESCRIPTION OF THE SEVERAL VIEWS OF THE DRAWING

FIG. 4 is a view showing an example of a format of a PHY frame of a second type;

FIG. 11 is a view showing a transmission managing table for use in retransmission control according to a third embodiment of the present invention;

FIG. 17 is a view showing an example of a carrier sense state of each communication apparatus in the case where a value of a duration field is defined in the communication apparatus according to the fourth embodiment;

FIG. 18 is a view showing an example of a super-frame header format for use in a communication apparatus according to a fifth embodiment of the preset invention;

DETAILED DESCRIPTION OF THE INVENTION

First Embodiment

Figure 1:
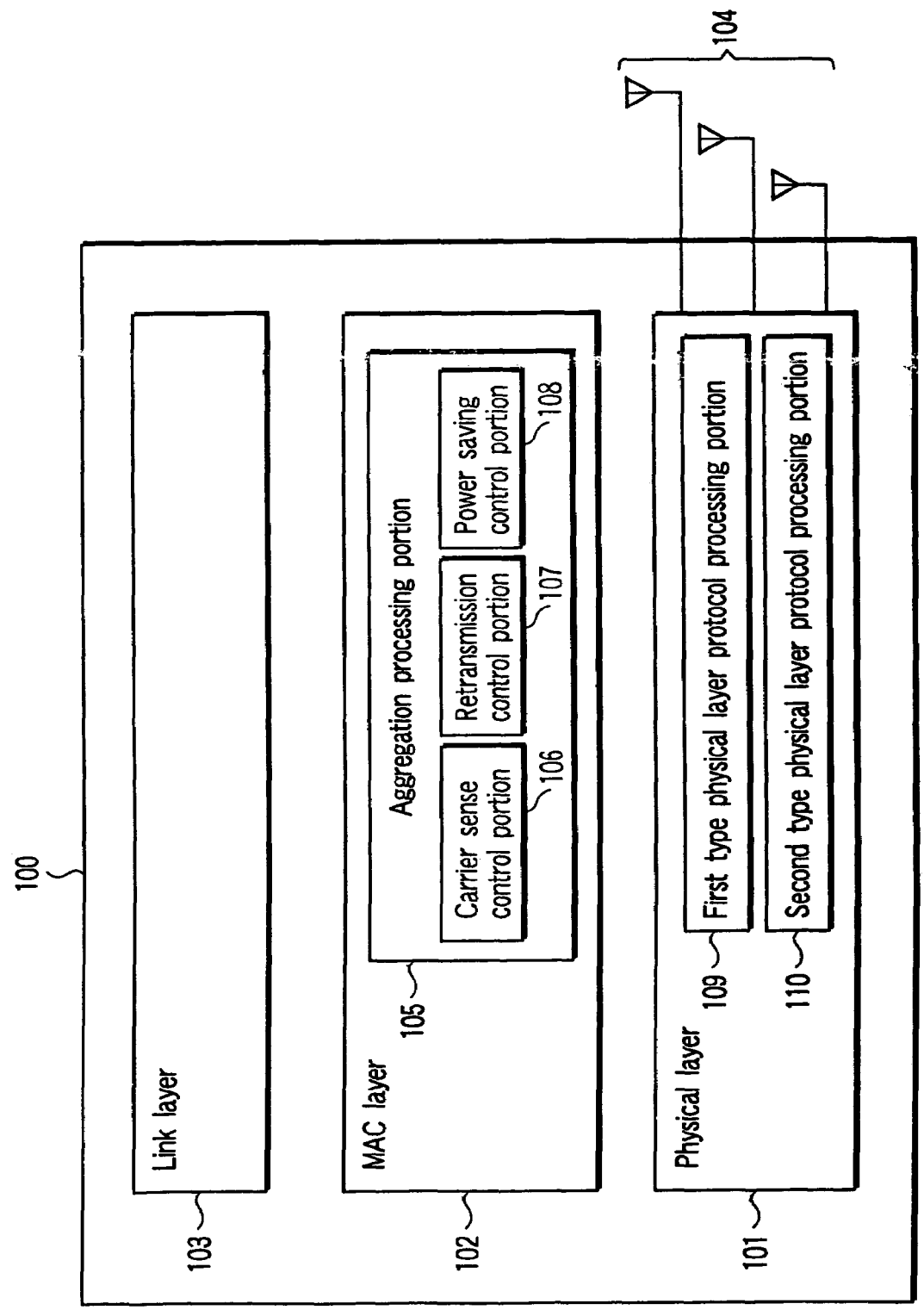
FIG. 1 is a block diagram depicting a configuration of a communication apparatus according to a first embodiment of the present invention.

FIG. 1 is a block diagram depicting a configuration of a communication apparatus according to a first embodiment of the present invention. This communication apparatus 100 is provided as an apparatus which communicates with another communication apparatus via a wireless link. This communication apparatus includes processing units 101, 102, 103 which correspond to a physical layer, a MAC layer, and a link layer, respectively. These processing units are implemented as an analog or digital electronic circuit according to packaging or as a firmware executed by a CPU incorporated in an LSI. An antenna 104 is connected to the processing unit 110 of a physical layer (hereinafter, an expression of "processing unit" is omitted). The MAC layer 102 includes an aggregation (integration) processing portion 105 according to embodiments of the present invention. The aggregation processing portion 105 comprises at least a carrier sense control portion 106 in the first embodiment. A retransmission control portion 107 shown in the figure relates to a second embodiment of the present invention, and a power saving control portion 108 relates to a third embodiment of the present invention. These elements will be described in detail in the embodiments. A physical layer 101 is composed so as to be compatible with physical layer protocols of two types. For the purpose of each protocol process, the physical layer 101 has a first type physical layer protocol processing portion 109 and a second type physical layer protocol processing portion 110. In packaging, a circuit is often shared between the first type physical layer protocol processing portion 109 and the second type physical layer protocol processing portion 110. Thus, these portions do not always exist independently.

In the embodiments of the present invention, it is assumed that a first type physical layer protocol is provided as a protocol defined in accordance with an IEEE 802.11a, and that a second type physical layer protocol is provided as a protocol with a so-called MIMO (Multiple Input Multiple Output), using a plurality of antennas at a transmitting side and a receiving side, respectively. Even frequency bandwidths are maintained to be identical to each other, it is possible to expect an increase of a transmission capacity which is substantially parallel to the number of antennas. Thus, the MIMO is one of the techniques which can be utilized for the achievement of a higher throughput. With respect to the link layer 103, it has a normal link layer function defined in accordance with the IEEE 802. A technique used to improve a transmission rate is not limited to the MIMO. For example, a method for increasing a frequency occupying bandwidth and a combination of such increasing method and the MIMO may be used.

Figure 2:
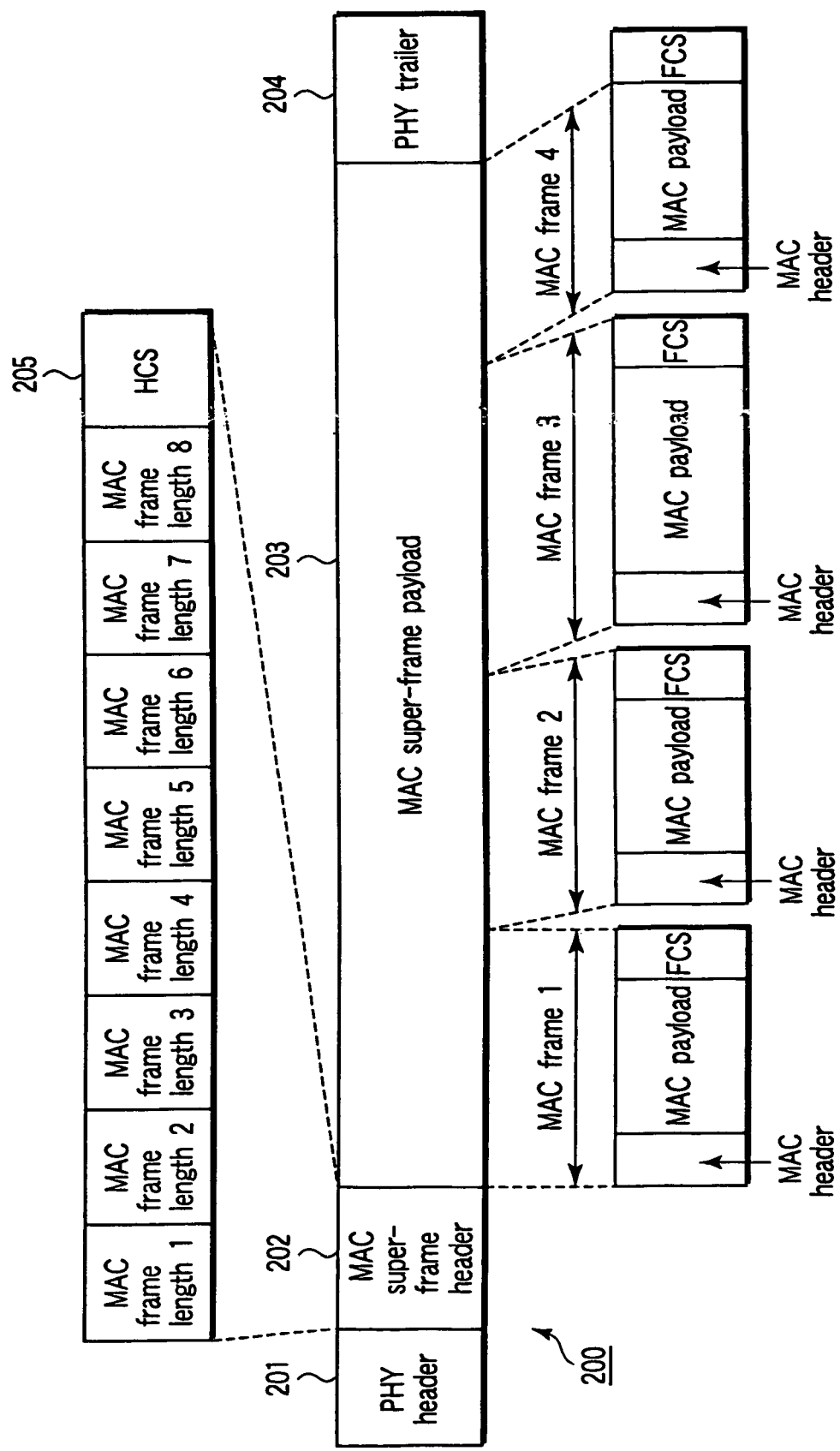
FIG. 2 is a view showing an example of a frame format for use in a communication apparatus according to an embodiment of the present invention.

FIG. 2 is a view showing an example of a frame forma for use in a communication apparatus according to an embodiment of the present invention. A frame format 200 schematically shows a frame structure according to a physical layer and a MAC layer. Specifically, it is assumed that the frame format follows the IEEE 802.11 or its extension. The frames in accordance with the IEEE 802.11 are roughly divided into three types, i.e., a control frame, a management frame, and a data frame. Although it is assumed that the embodiment of the present invention is mainly applied to the data frame, it does not always imply that application to the control frame or management frame is omitted. As shown in FIG. 2, the frame format 200 includes a PHY header 201; a MAC super-frame header 202 and a MAC super-frame payload 203; and a PHY trailer 204. The MAC super-frame header 202 and the MAC super-frame payload 203 each correspond to a PHY payload described later.

The PHY header 201 is processed by the physical layer 101 of a receiving communication apparatus. That is, the physical layer 101 carries out detection of a frame head; carrier sensing, establishment of timing synchronization, amplitude control of an amplifier (AGC: Automatic Gain Control), keeping track of a transmitting carrier frequency (Automatic Frequency Control), estimation of a transmission channel and the like, based on the received PHY header 201. In addition, the physical layer 101 carries out detection of a modulation scheme or encoding rate, and a transmission rate and data length of the PHY payload that follows the PHY header 201.

Figure 3:
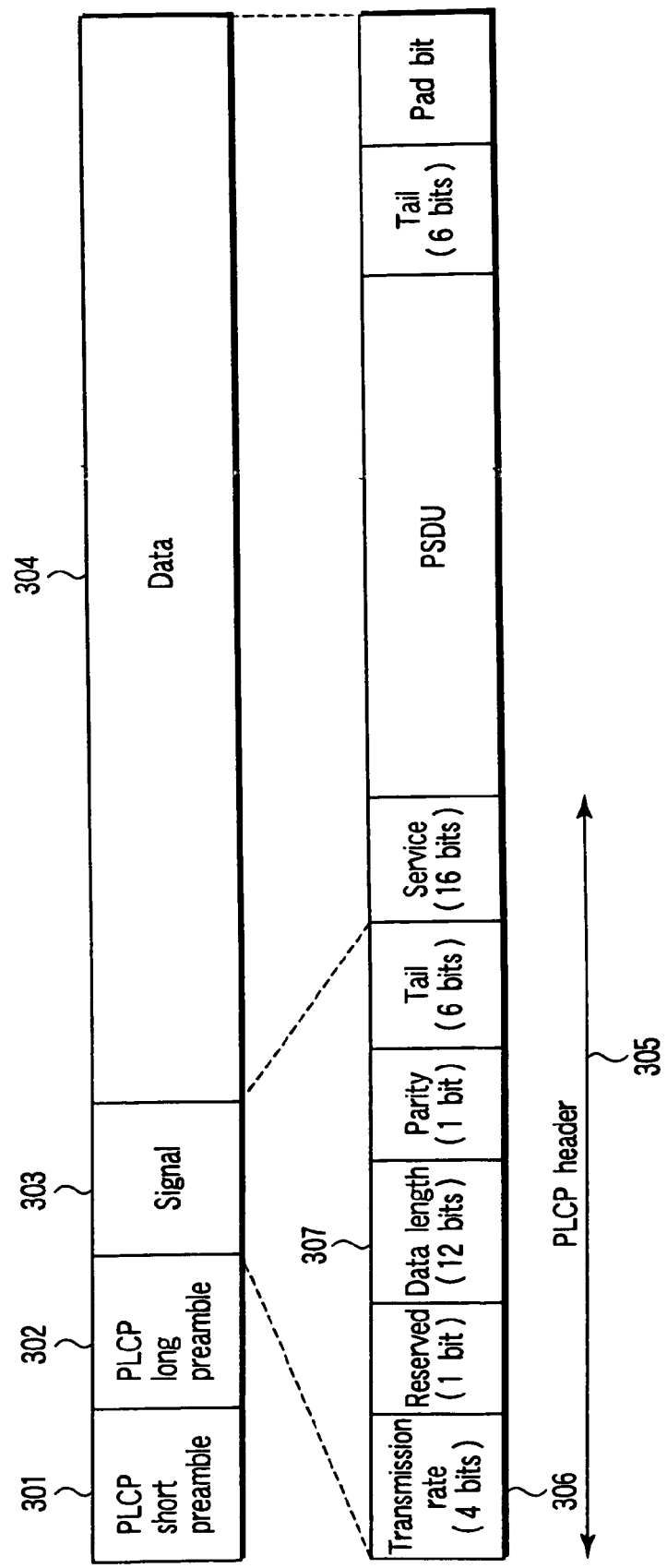
FIG. 3 is a view showing an example of a format of a PHY frame of a first type.

FIG. 3 is a view showing an example of a format of a first type PHY frame. This format is identical to that defined in accordance with the IEEE 802.11a. The first type PHY frame is used when a communication apparatus according to embodiments of the present invention communicates with an existing communication apparatus. This PHY frame is processed by the first type physical layer protocol processing portion 109 of the physical layer 101 (hereinafter, referred to as communication conforming to the IEEE 802.11a). As shown in FIG. 3, a first PHY frame, i.e., a first type PLCP frame includes a PLCP (Physical Layer Convergence Protocol) short preamble 301 and a PLCP long preamble 302; a signal field 303; and a data field 304. The signal field 303 corresponds to a PLCP header 305. As shown in the figure, this signal field includes a transmission rate field 306 and a data length field 307. Of course, the first type PHY frame is not limited to that defined in accordance with the IEEE 802.11a.

FIG. 4 is a view showing an example of a format of a second type PHY format. The second type PHY frame, i.e., a second type PLCP frame includes a first header portion 401 for a first physical layer protocol; and a second header portion 402 for a second physical layer protocol. The first header portion 401 and the second header portion 402 are allocated along a time series, each of which corresponds to the PHY header 201 shown in FIG. 2. In addition, the second type PHY frame includes a PHY payload 403 that follows the second header portion 402; and Tail and Pad bits 404. The PHY payload 403 corresponds to the MAC super-frame header 202 and the MAC super-frame payload 203 in FIG. 2, and corresponds to a PSDU (PLCP Service Data Unit) in a format of a physical layer. Further, the Tail and Pad bits 404 correspond to the PHY trailer 204 of FIG. 2.

The first header portion 401 for the first type physical layer protocol includes a PLCP short preamble 405; a PLCP long preamble 406; and a signal field 407. The signal field 407 corresponds to all or part of the PLCP header. An effective value is set so as to carry out physical carrier sensing in at least a transmission rate field 408 and a data length field 409. Such a signal field 407 has the same information contents and modulation scheme which correspond to those of the PLCP header 305 of the first type PHY frame shown in FIG. 3.

The second header portion 402 for the second type physical layer protocol includes a MIMO PLCP long preamble 410; a MIMO signal field 411; and a MIMO service field 412. The exemplary format shown in FIG. 4 is for the purpose of explanation, and may be changed if necessary. In FIG. 4, for example, MIMO PLCP long preamble 410 and MIMO signal field 411 can be swapped in their arrangement order. The MIMO signal field 411 includes a transmission rate field 413 and a data length field 414 as shown in the figure, and is referenced in physical carrier sensing. The MIMO PLCP long preamble 410 is used when a receiving communication apparatus of the MIMO capable of interpreting the second type physical layer protocol acquires transmission channel information required for a decoding process.

By defining the second type PHY frame as a format as shown in FIG. 4, an existing communication apparatus which can be operated in accordance with only the first type physical layer protocol can interpret at least a first signal field 407. Thus, carrier sensing of the physical layer can be correctly carried out in accordance with the signal field 407. Therefore, the same carrier sense information at physical layer can be shared between such an existing communication apparatus and the first type and second type physical layer protocols each. The existing communication apparatus can not share the carrier sense information contained in the MAC layer. However, this fact does not cause a problem because of a partial ACK described later.

When a PHY payload is transmitted on a physical medium, information representing a medium occupation duration (hereinafter, referred to as a "physical occupation duration") due to the PHY payload is utilized as carrier sense information contained in a physical layer together with signal intensity. At a time point when a receiving communication recognizes a physical occupation duration of the PHY payload by means of physical carrier sensing, the communication apparatus interprets that a physical medium is occupied (PHY busy) during the duration. In addition, this communication apparatus interprets that the physical medium is occupied also in a duration in which signal intensity exceeds a predetermined threshold value. The physical occupation duration of the PHY payload can be obtained by means of calculation based on a transmission rate (408 or 413) of the PHY payload and data length (409 or 414) detected in the receiving communication apparatus. Specifically, this duration can be obtained by dividing a value of a data length field expressed in an octet length by a value of a transmission rate field. This also applies to a first type PHY frame shown in FIG. 3.

In the case where a maximum data length (4096 octets in the IIEEE 802.11a) of the PHY payload which the first type physical layer protocol permits is actually shorter than a maximum data length of the PHY payload which the second type physical layer protocol permits, the carrier sense information contained in the physical layer can be shared by intentionally falsely setting the transmission rate field 408 and the data length field 409 so that the physical occupation duration of the PHY payload becomes proper.

Here, a description will be given again with reference to FIG. 2. One MAC super-frame, which includes a plurality of MAC frames, corresponds to a single PHY frame. In the frame format 200 shown in the figure, the MAC super-frame header 202 always has data length fields 1 to 8 of eight MAC frames. Although the MAC super-frame header 202 has a fixed length in the present embodiment, the MAC super-frame header 202 may have a variable length by adding information indicating the number of MAC frames.

In the case where, as shown in FIG. 2, only four MAC frames 1 to 4 are included in the MAC super-frame payload 203, the MAC frame data length fields 5 to 8 corresponding to the MAC frames 5 to 8 which do not exist in the same payload 203 are padded with zero values. In addition, during retransmission control described later, for example, in the case where MAC frame 1 and MAC frame 3 are required to be retransmitted while MAC frame 2 and MAC frame 4 are not required to be retransmitted, the MAC frame data lengths are specified such as MAC frame data length 1>0, MAC frame data length 2=0, MAC frame data length 3>0, and MAC frame data length 4=0. I.e., the MAC frame data lengths corresponding to the MAC frames which are not subject to retransmission are set to zero.

An HCS 205 denotes a Header Check Sequence. In order to enable detection of an error of the MAC super-frame header 202, the sequence is added to the same header 202. In the case where the receiving communication apparatus has detected an error of the MAC super-frame header 202 by means of the NCS 205, it is interpreted that all the MAC frames included in the MAC super-frame payload 203 are destroyed. It is preferable that the number of MAC frames included in the MAC super-frame payload 203 be dynamically restricted in order to prevent a buffer overflow in the receiving communication apparatus. For this purpose, for example, Sliding Window control described later can be utilized.

Figure 5:
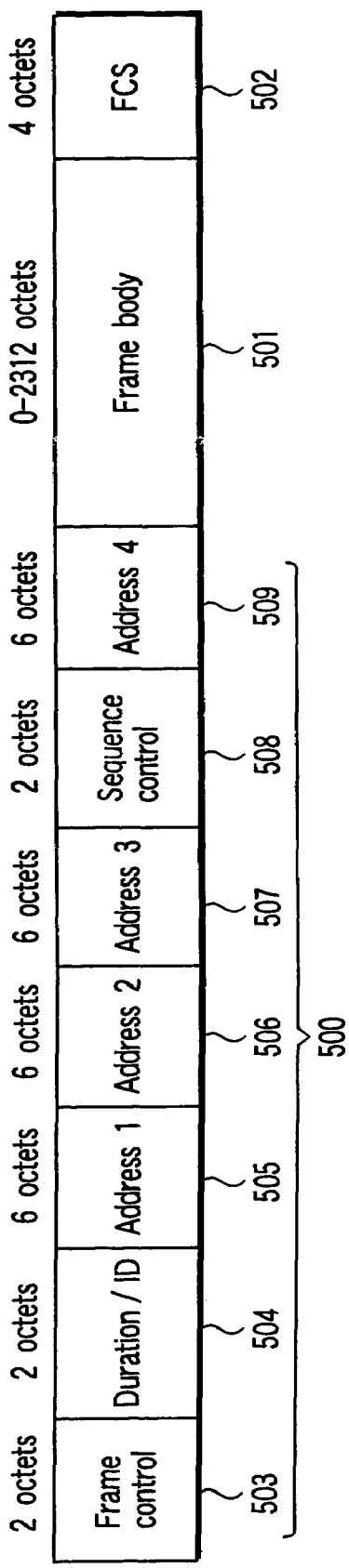
FIG. 5 is a view showing an example of a format of a MAC frame.

FIG. 5 is a view showing an example of a format of a MAC frame. One MAC frame included in the MAC super-frame payload 203 of FIG. 2 includes a MAC header 500; a frame body 501; and an FCS (frame check sequence) 502. The MAC header 500 includes a frame control field 503; a Duration field 504; address fields 505 to 507 and 509; and a sequence control field 508. The frame body 501 has a variable length in the range of 0 to 2312 octet lengths, and is provided as a payload of a MAC frame which corresponds to a MPD (MAC Protocol Data Unit).

With a higher communication data rate of a physical layer in accordance with a second type physical layer protocol (MIMO is defined in the present embodiment), a plurality of MAC frames are included in a PHY frame as a MAC super-frame (an aggregation), thereby efficiently configuring a format in the present embodiment. While an overhead for each PHY frame, i.e., a PLCP header, a variety of IFSs (Inter Frame Space), back-off and the like, is the same, the carried data in a PHY frame is increased by the aggregation. Thus, a communication throughput can be improved substantially.

A media access control is made based on carrier sensing of a physical layer and carrier sensing of a MAC layer. Now, a description will be given with respect to a robust MAC carrier sensing according to a feature of the first embodiment.

Figure 6:
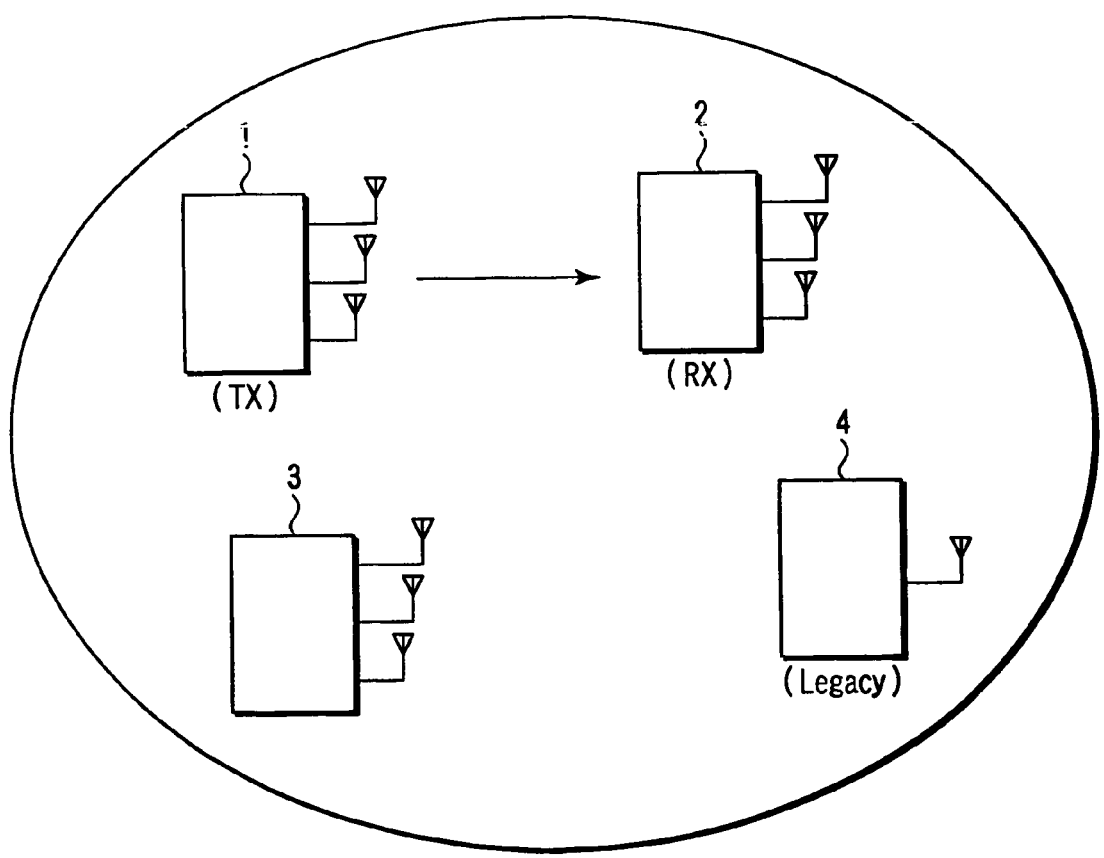
FIG. 6 is a view showing an example of a communication system according to one embodiment of the present invention.

FIG. 6 is a view showing an example of a communication system according to one embodiment of the present embodiment. In this communication system, it is assumed that communication apparatuses 1 to 4 make communication via a wireless link. The communication apparatuses 1 to 3 shown in the figure each have a feature shown in FIG. 1. In contrast, the communication apparatus 4 comprises only the first type physical layer protocol processing portion 109, and does not comprise the second type physical layer protocol processing portion 110. Therefore, this communication apparatus corresponds to an existing communication terminal which does not carry out transmission of a MAC super-frame. Hereinafter, a description will be given assuming that communication is made while the communication apparatus 1 is defined as a transmitting side and the communication apparatus 2 is defined as a receiving side, and assuming that the communication apparatus 3 and communication apparatus 4 do not relate to this communication.

As has been described with reference to FIGS. 2 and 5, each of the Mac frames included in the MAC super-frame (aggregation) payload 203 includes: a MAC header 500; and an FCS 502 capable of detecting an error of the entire MAC frame which includes the MAC header 500. The transmitting communication apparatus 1 sets a value of a duration field 504 of each MAC header 500 in each Mac frame as follows when constructing the MAC super-frame payload 203 to be transmitted. That is, when at least one MAC frame included in the MAC super-frame payload 203 is correctly received, communication apparatus 2 having received the frame sets a value such that a carrier sense state of a MAC layer can be correctly recognized. Specifically, for example, either of the method 1 and method 2 described below are followed.

(Method 1): A value of a duration starting with a time point when a PHY frame including the MAC super-frame 203 has terminated and ending with a time point when a MAC frame defined as a continuous sequence in a MAC layer has been exchanged, or alternatively, a value of a duration ending with a time point when a medium reservation carried out in the MAC layer has terminated, are set in the duration field 504. According to the method 1, the same value is set in the duration fields 504 of at least a plurality of MAC frames included in the MAC super-frame 203 (refer to FIG. 7).

(Method 2): A value of a duration starting with a time point when the MAC frame including a duration field has terminated and ending with a time point when a MAC frame defined as a continuous sequence in a MAC layer has been exchanged, or alternatively, a value of a duration ending with a time point when a medium reservation carried out in the MAC layer has completed, is set in the duration field 504. According to the method 2, different values each are set in the duration field 504 of the MAC frame included in the MAC super-frame 203 (refer to FIG. 8).

Further, a receiver address is set as follows in one of the address fields 505 to 507 and 508 contained in the MAC header 500 in each MAC frame (specifically, corresponding to address 1 to address 3 and address 4). That is, the MAC address of the corresponding communication apparatus is set so that all the MAC frames with the duration value specified above in the same MAC super-frame each indicate the same receiver.

In the present embodiment, the communication apparatus 2 having a MAC address which corresponds to a receiver address generally relates to a MAC frame exchange sequence in a duration specified in the duration field 504, and has a transmission privilege that follows a rule on the MAC frame exchange sequence. In contrast, the communication apparatuses 3, 4 which do not correspond to the receiver address do not relate the MAC frame exchange sequence, and does not have the transmission privilege in this duration.

The communication apparatus 3 which does not relate to the MAC frame exchange sequence refers to a value of the duration field 504 in the MAC header 500 of any of the received MAC frames with the duration value specified above; interprets that a medium is virtually (logically) occupied in a duration which corresponds to this value; and does not carry out frame transmission until the duration has terminated. Such a duration is referred to as a "virtual medium occupation duration". Thus, the communication apparatus 3 sets a NAV (Network Allocation Vector) for disabling transmission in the virtual medium occupation duration. Such NAV setting based on the virtual carrier sensing of the MAC layer is provided regardless of a physical medium occupation duration based on carrier sensing of a physical layer. On the other hand, like the communication apparatus 3, the existing communication apparatus 4 which does not relate to the MAC frame exchange sequence enters a state of waiting for an EIFS (Extended IFS) duration. An operation of the existing communication apparatus 4 in this case will be described later in detail In the embodiments of the present invention, since a plurality of MAC frames are integrated into one PHY frame, carrier sensing of the MAC layer is robustly carried out, whereby a virtual medium occupation duration can be properly set.

Figure 9:
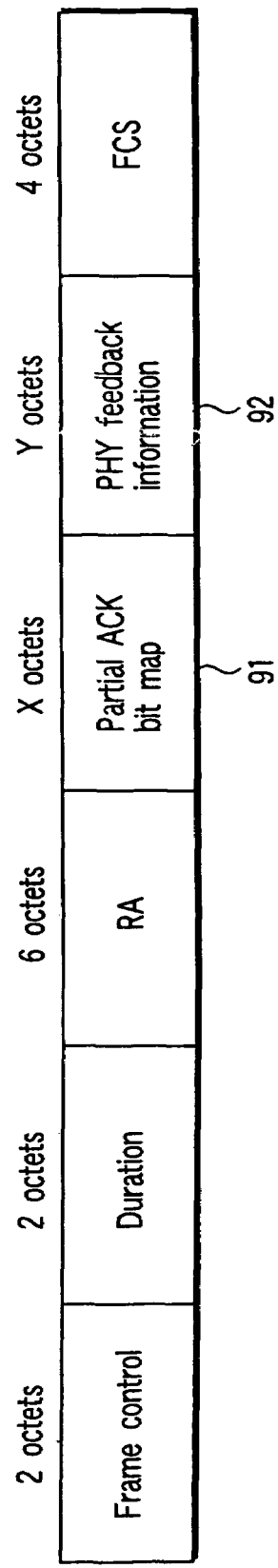
FIG. 9 is a view showing an example of a format of a partial ACK frame.
Figure 7:
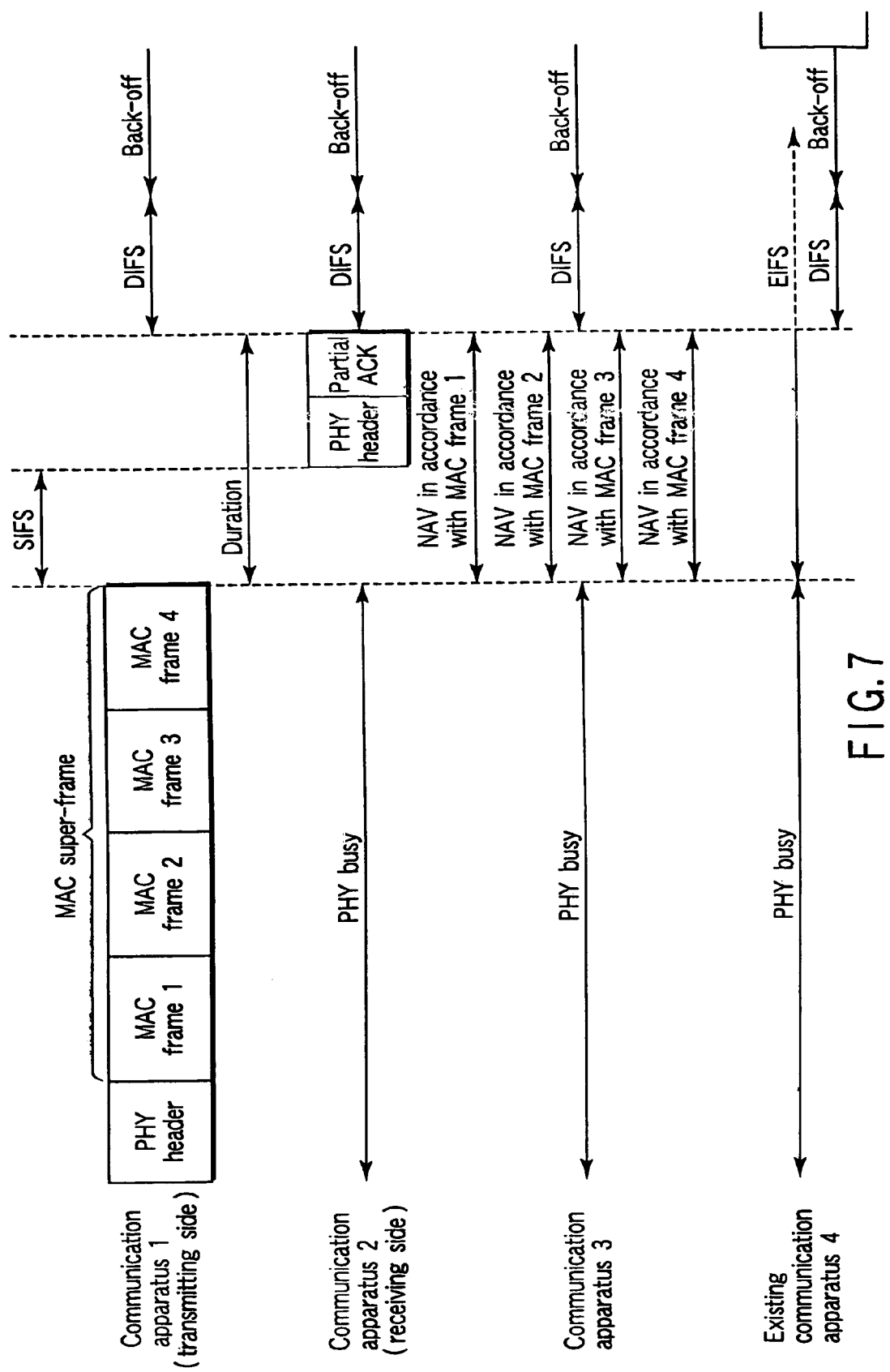
FIG. 7 is a view showing an example of a carrier sense state of each communication apparatus in the case where a value of a duration field has been defined in accordance with a method 1.

FIG. 7 shows an example of a carrier sense state of each communication apparatus in the case where a value of the duration field 504 has been defined in accordance with the above method 1. A value of the duration field 504 of MAC frame 1, MAC frame 2, MAC frame 3, and MAC frame 4 each is set to a sum of a SIFS (Short IFS) and a transmission time of a partial ACK, one example of which is shown in FIG. 9.

It is necessary to define a rule so that the transmitting communication apparatus 1 can calculate a transmission time of the partial ACK and so that a receiving side can uniquely select a method of transmitting the partial ACK. It is assumed that the partial ACK is carried by a PHY frame conforming to the IEEE 802.11a which is the first type physical protocol shown in FIG. 3, and is transmitted at a maximum mandatory transmission rate conforming to the IEEE 802.11a. As described later, it is important that the partial ACK can be decoded and interpreted by a communication apparatus capable of interpreting only the first type physical protocol to ensure the purpose of backward compatibility.

When the receiving communication apparatus 2 receives a frame transmitted from the transmitting communication apparatus 1, the receiving communication apparatus 2 first recognizes that a medium is busy, i.e., enters a occupying state by carrier sensing of the physical layer. Further, the communication apparatus 3 (capable of interpreting first type and second type physical protocols and its address is different from the receiver address and a transmitter address specified in MAC frame 1 to MAC frame 4) and the communication apparatus 4 (capable of interpreting only the first physical protocol) recognize that a medium enters an occupying state by carrier sensing of the physical layer similarly.

Next, if it is determined that any of MAC frame 1 to MAC frame 4 is correct by the FCC, the receiving communication apparatus 2 recognizes that there is no need for setting NAV because the destination address is identical to an address of the communication apparatus 2. In accordance with a rule on the MAC frame exchange sequence, the receiving communication apparatus 2 transmits the partial ACK after an elapse of the SIFS after the receiving of the second type PHY frame including the MAC super-frame has completed.

If it is determined that any of MAC frame 1 to MAC frame 4 is correct by the FCS, the communication apparatus 3 recognizes that NAV should be set as a receiver address is different from the address of the communication apparatus 3. The communication apparatus 3 sets NAV in a duration which corresponds to a value of the duration field 504 included in any of MAC frame 1 to MAC frame 4 determined to be correct by the FCS.

The existing communication apparatus 4, which cannot recognize a signal field and subsequent of a second type PHY frame, advances processing as if it were a first type. PHY frame. Then, this communication apparatus calculates an FCS and detects an error at the end of the frame. Alternatively, the communication apparatus detects an error at the end of the frame, since it recognize that there occurs a PHY fame of such type which cannot be interpreted. In these cases, the communication apparatus 4 cannot recognize correctly a virtual carrier sense state of the MAC layer to be set by reception of the PHY frame, and thus, enters an error recovery state. Namely, this communication apparatus enters a state of waiting for an EIFS duration which is the longest IFS. In this waiting state, the communication apparatus 4 receives a partial ACK originated from the receiving communication apparatus 2 before terminating the EIFS. As described above, since a partial ACK is transmitted at a mandatory rate conforming to the IEEE 802.11a which is the first type physical layer protocol, the existing communication apparatus 4 can interpret this ACK. If the partial ACK is correctly received, carrier sensing of the MAC layer is correctly carried out. Thus, the waiting state caused by the EIFS is cancelled, and no problem occurs. Therefore, the communication apparatus according to embodiments of the present invention and the existing (legacy) communication apparatus can coexist.

The transmitting communication apparatus 1, the communication apparatus 3, and the existing communication apparatus 4 each receive the partial ACK transmitted by the receiving communication apparatus 2. A value of the duration field 504 in this partial ACK is set to 0, and concurrently, each of the communication apparatuses sets NAV to 0. A MAC frame exchange sequence that follows the partial ACK may be defined on the MAC sequence. In that case, the value of the duration field 504 in the partial ACK is obtained as a value indicating an end time point of the MAC sequence.

If all the communication apparatuses have data to be transmitted, they continuously enter a waiting state caused by the DIFS (DCF IFS, i.e., Distributed Coordinate Function IFS). In this DIFS duration, if carrier sensing of the physical layer and MAC layer indicates an idle state, a current state enters a back-off duration, and countdown is started. Then, a communication apparatus in which a counter initialized by random numbers has reaches 0 first in the apparatuses obtains a transmission privilege.

Now, an error which can occur during receiving of the second type PHY frame will be described here. Consider a case in which there is no MAC frame which is determined to be correct by the FCS as a result of the communication apparatus 2 decoding the MAC frames included in the second type PHY frame. In the case where there is no MAC frame which is determined to be correct by the FCS, the communication apparatus 2 cannot recognize correctly a virtual carrier sense state of a MAC layer to be set based on receiving of the second type PHY frame, and thus, a current state goes to an error recovery state. Namely, the current state goes to a state of waiting for an EIFS duration which is the longest IFS. In the case where the non-receiving communication apparatus 3 goes to the state of waiting for the EIFS duration and the communication apparatus 2 receives at least one MPDU correctly, the communication apparatus 3 receives the partial ACK transmitted from the receiving communication apparatus 2. If the partial ACK is correctly received by the communication apparatus 3, carrier sensing of the MAC layer is correctly carried out as described later, and therefore, the waiting state of the communication apparatus 3 caused by the EIFS is canceled at this time.

Assuming that an error occurs at the communication apparatus 2 and the communication apparatus 2 simultaneously during receiving as described above, the receiving communication apparatus 2 goes to the state of waiting for the EIFS duration without sending the partial ACK. The EIFS state at the communication apparatus 3 is not reset by the Partial Ack sent from the communication apparatus 2. In this case, in the case where the EIFS duration is longer than a duration caused by NAV and DIFS, a state in which any communication apparatus cannot carry out transmission occurs at least in this duration. This event reduces use efficiency of a physical medium for use in communication, and thus, should be avoided with an utmost effort.

However, according to the embodiments of the invention, since a plurality of MAC frames are included in the MAC super-frame payload 203, carrier sense information contained in the MAC layer can be obtained based on any of the plurality of MAC frames. As a result, an error is less likely to occur during receiving as described above. Specifically, a plurality of MAC frames from among the MAC frames included in the MAC super-frame have information required for carrier sensing of the MAC layer, i.e., carrier sense information contained in the MAC layer which includes at least the duration field 504 and a receiver address. Since each of these MAC frames has an FCS, the presence or absence of an error can be detected. Even if an error occurs during receiving of any MAC frame, at least one of the remaining MAC frames may be correctly received. Therefore, carrier sensing of the MAC layer can be robustly carried out based on at least one MAC frame which has been successfully received, and an error tolerance can be relatively enhanced during receiving per PHY frame.

Figure 8:
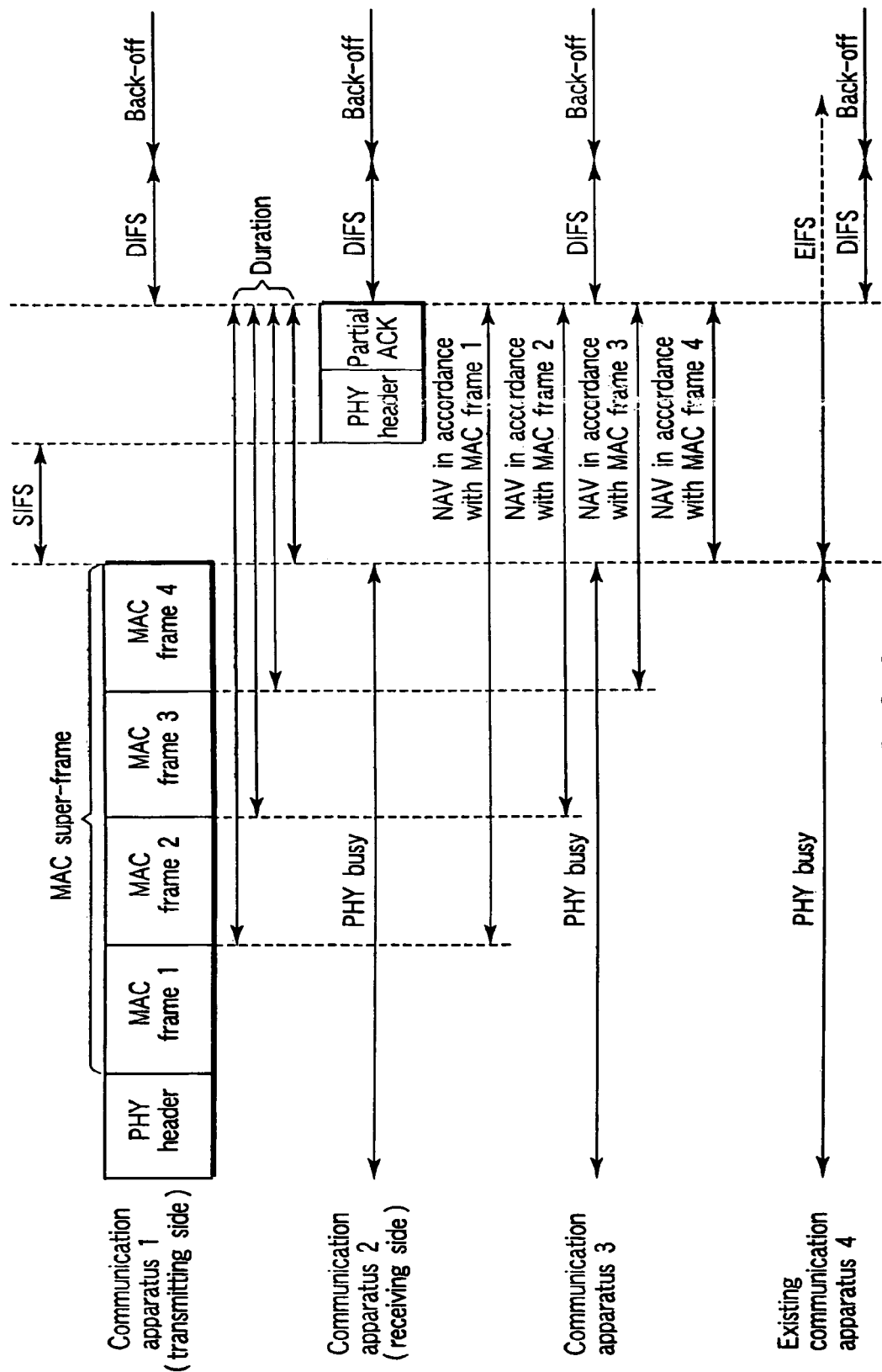
FIG. 8 is a view showing an example of a carrier sense state of each communication apparatus in the case where a value of a duration field has been defined in accordance with a method 2.

FIG. 8 shows an example of a carrier sense state of each communication apparatus in the case where a value of the duration field 504 has been defined in accordance with the above method 2. Only a difference from FIG. 7 will be briefly described here. The value of the duration field 504 of MAC frame 1 is set at a value of a sum among a transmission time of MAC frame 2, MAC frame 3, and MAC frame 4, a SIFS duration, and a transmission time of a partial ACK frame. The value of the duration field 504 of MAC frame 2 is set at a value of a sum among a transmission time of MAC frame 3 and MAC frame 4, a SIFS duration, and a transmission time of a partial ACK frame. A value of each duration field 504 of MAC frame 3 and MAC frame 4 is also set in a similar method. Namely, unlike the case of FIG. 7, the values of the duration field 504 are different from each other depending on each MAC frame, and concurrently, the settings of NAV are also different from each other.

With respect to NAV set by the communication apparatus 3 (whose address is different from the receiver address and the transmission source address of each of MAC fame 1 to MAC frame 4 and which can interpret first type and second type physical protocols), an end time point of a MAC frame including the duration field 504 is defined as a start point, and the NAV value is set.

In such a method 2 as well as method 1, a medium occupation time i.e. NAV set by each of the MPDU in the MAC super-frame terminates at the same time as is evident from FIG. 8.

Second Embodiment

Figure 10:
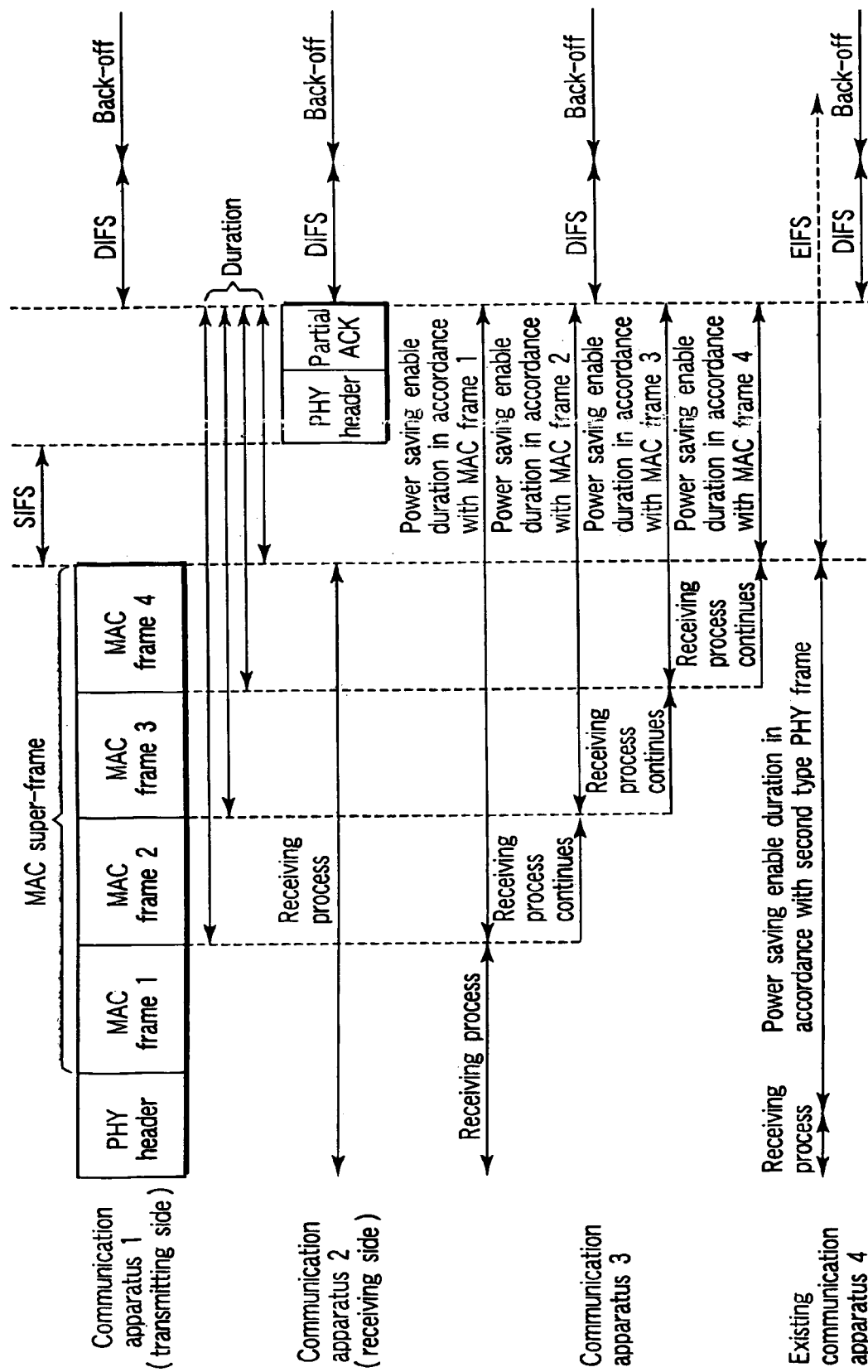
FIG. 10 is a view illustrating a power saving control according to a second embodiment of the present invention.

A second embodiment of the present invention relates to power saving control. FIG. 10 is a view illustrating power saving control according to the second embodiment of the invention. According to the present embodiment, the transmitting communication apparatus 1 and the receiving communication apparatus 2 being in communication are controlled so as not to be switched to a power saving state, and a communication apparatus which does not relate to communication can be controlled so as to be switched to the power saving state.

At a time point when the communication apparatus 3 recognizes any of the MAC frames included in the MAC super-frame included in the second type PHY frame is recognized to be correct by the FCS, the communication apparatus 3 recognizes that there is no need for carrying out reception or transmission over a duration in which NAV set by the communication apparatus 3 itself terminates, and starts a power saving operation from that time point. However, in this case, each MAC frame must be encoded in the PHY frame so that such each MAC frame is decoded in a time series on the receiving side.

A power saving state terminates at a NAV end time point because there is a need for carrying out carrier sensing in the DIFS duration and back-off duration after terminating NAV. By recognizing the power saving state, power saving can be achieved by stopping an unnecessary circuit. Specifically which circuit is stopped at which timing or is restarted at which timing depends on implementation.

With respect to the existing communication apparatus 4 as well, at a time point when a continuation time of a second type PHY frame is recognized based on a signal 407 in a second type PHY frame and it is recognized that this PHY frame is transmitted in a scheme in which the communication apparatus 4 cannot carry out decoding, a duration for the PHY frame to terminate can be recognized as a power saving state. However, during the EIFS duration, there is a need for carrying out carrier sensing, and the power saving state is not established.

Third Embodiment

A third embodiment of the present invention relates to retransmission control. From the viewpoint of communication fairness or QoS (Quality Of Service), it is preferable that retransmission be controlled to limit consecutive communication to the same terminal. FIG. 11 is a view showing a transmission managing table for use in retransmission control according to the third embodiment of the invention. In this transmission managing table, a Sliding Window is expressed. For convenience of explanation, the transmission managing table expresses a full history of transmission and reception including retransmission. However, in actual implementation of a communication apparatus, there is no need for storing the full history described here.

Consider a state in which the same transmitting communication apparatus continuously transmits a MAC frame (MPDU) to the same receiving communication apparatus prior to communication of another frame. In order to avoid biases assignment of transmission and reception privileges to specific communication apparatuses or a pair of a transmitting communication apparatus and a receiving communication apparatus, the number of MAC frames which can be continuously transmitted is limited based on the transmission managing table. This limitation is effective until either of the transmitting communication apparatus and the receiving communication apparatus has been changed.

In the transmission managing table shown in FIG. 11, a limited number of MAC frames which can be continuously transmitted is defined to a maximum of 16, and this is referred to as full window W_all. In addition, to a series of MAC frames (MPDU) targeted to be continuously transmitted, a sequence number (Seq. No.) is assigned in the transmission managing table. A start point of full window W_all corresponds to SEQ1, and its end point corresponds to SEQ16. Transmission (or retransmission) of frames included in full window W_all is delimited, and is carried out based on a series of transmission sequences (or retransmission sequences) described later. Full window W_all may be variable in consideration of a state of congestion, priority assigned to the receiving communication apparatus and the like. If full window W_all is increased, although a delay and a jitter increase or unfairness between the communication apparatuses or the like increases, a whole throughput is likely to be improved. Therefore, when it is recognized that real time communication of voice or mobile image exists, dynamic control may be made such that the size of the full window is reduced. In such a control, the whole throughput itself is likely to be reduced, and thus, dynamic control may be used in combination with any traffic control such as priority control based on traffic type.

In addition, a maximum value of full window W_all and window W_n (n=1, 2, 3, . . . ) at each time point may be set after negotiation is carried out in accordance with any protocol for each pair of transmitting and receiving communication apparatuses or a common value in the whole system may be used. Even in the case where the system common value is used, there is no need for setting a fixed value.

A retransmission control portion 107 of the transmitting communication apparatus constructs a MAC super-frame with reference to the transmission managing table. At this time, the retransmission control portion 107 selects a MAC frame to be included in the MAC super-frame in consideration of the necessity of retransmission.

Although a plurality of MAC frames are included in a single MAC super-frame, a maximum number of MAC frames which can be stored is limited. In the present embodiment, up to eight MAC frames can be included. The receiving communication apparatus needs to be able to buffer the above maximum number of MAC frames. The receiving communication apparatus passes a MAC frame, in the form that a sequence is kept, to the upper layer of the MAC layer. In this manner, the correctly received MAC frame needs to be stored in a buffer until it has been determined that a MAC frame having a sequence number preceding that of the correctly received MAC frame is correctly received by retransmission or that a MAC frame having a sequence number preceding that of the correctly received MAC frame is not to be retransmitted any more (e.g. by timeout). This buffer has a space to store MAC frames from a MAC frame with the lowest sequence number which is yet to be received correctly to a MAC frame with a sequence number which corresponds to the lowest sequence number +7.

In FIG. 11, the range of these sequence numbers at each time point is expressed as a start point and an end point by windows W1 to W5, respectively. The MAC frame to be included in the MAC super-frame and transmitted by the transmitting communication apparatus is limited to MAC frames required to be transmitted because they are not acknowledged and need to be retransmitted in this window range as well as MAC frames newly transmitted in this window range. In FIG. 11, in the case where "LenX" is written in each of TX1 to TX5, a MAC frame of sequence number X is transmitted by transmission of the corresponding MAC super-frame. In the case where "0" is written, the MAC frame of the corresponding sequence number is not transmitted. These values correspond to data length fields 1 to 8 of the MAC frames in the MAC super-frame header 202 shown in FIG. 2. In the case where "o" is entered in each of RX1 to RX5, this indicates that the MAC frame of the corresponding sequence number has already been correctly received. In the case where "x" is entered in each of RX1 to RX5, this indicates that the MAC frame of the corresponding sequence number has never been correctly received until this time point has been reached. These "o" and "x" correspond to true and false values, and correspond to values of a partial ACK bit map (Partial ACK Bitmap) 91 in the partial ACK frame shown in FIG. 9.

At the beginning of windows W1 to W5 at each time point, the sequence number of a MAC frame which has never been correctly received by the receiving communication apparatus is entered. The lower limit of an advancing speed at the start point of this window is determined by the retransmission count. After the predetermined retransmission count has been reached, the windows must be advanced beyond a window size (8 in this case). If this condition has not been met, the transmitting communication apparatus terminates (re)transmission. In short, a condition in which transmission of continuous MAC frames is continued is that the MAC frame is received on the receiving side within the retransmission limit.

In the present embodiment, assuming that the retransmission limit is 3, it is determined that retransmission has failed, although the MAC frame of sequence number 15 has been retransmitted three times from TX3 to TX5, in an example shown in FIG. 11. Therefore, a series of retransmission sequences to a communication apparatus being a retransmission destination is canceled at this time point. Such a retransmission limit is effective in that, for example, in the case where the receiving communication apparatus comes out of the radio communication coverage, wasteful transmission can be avoided according to, for example, a state in which a transmission channel state with the receiving communication apparatus is worsened over a comparatively long period of time.

Only the transmitting communication apparatus recognizes that retransmission sequences have terminated at this time point. The receiving communication apparatus passes sequence numbers 1 to 14 from a buffer to a host unit. However, sequence number 15 is not correctly received, and thus, sequence number 16 is left in the buffer. In this case, the receiving communication apparatus receives a MAC super-frame starting with a MAC frame having a sequence number which is greater than a sequence number of a MAC frame which has not been acknowledged by one's own device. In this manner, the receiving communication apparatus recognizes that the transmitting communication apparatus has given up retransmission of the MAC frame which has not been acknowledged by one's own device. Then, the receiving communication apparatus passes to the upper layer processing step all of the MAC frames each having a sequence number which is smaller than the first sequence number of the new MAC super-frame, and empties the buffer. In a single MAC super-frame, sequence numbers are continuously assigned to MAC frames each. Thus, even if the first MAC frame is destroyed, if there exist one or more other MAC frames which have been normally received successfully, the receiving communication apparatus can recognize the sequence number of the first MAC frame.

If there does not exist receiving of a new MAC super-frame from the transmitting communication apparatus over a predetermined period of time, the receiving communication apparatus passes to the upper layer processing step the MAC frame retained in the buffer assigned to the transmitting communication apparatus.

Now, a description will be given with respect to an operation of each of the transmitting communication apparatus and the receiving communication apparatus when retransmission control is made based on the transmission managing table described above. In the following description, a transmitting communication apparatus is defined as STA0, and a receiving communication apparatus is defined as STA1.

Figure 12:
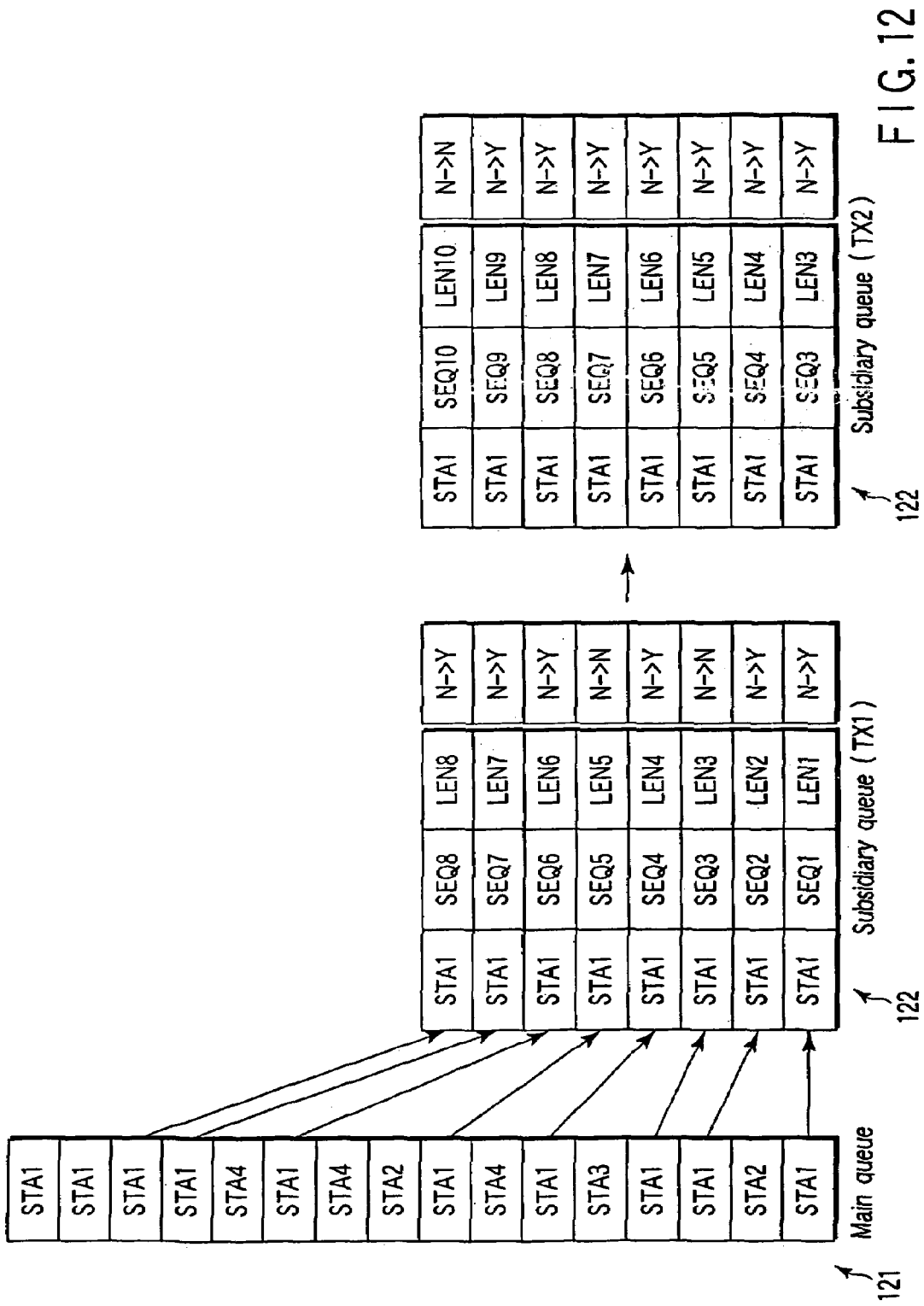
FIG. 12 is a view showing a main queue and a subsidiary queue for use in retransmission control of a transmitting communication apparatus.

FIG. 12 is a view showing an example of a main queue 121 and a subsidiary queue 122 for use in retransmission control of the transmitting communication apparatus in accordance with the present embodiment. The subsidiary queue 122 corresponds to the buffer described with reference to FIG. 11.

Figure 13:
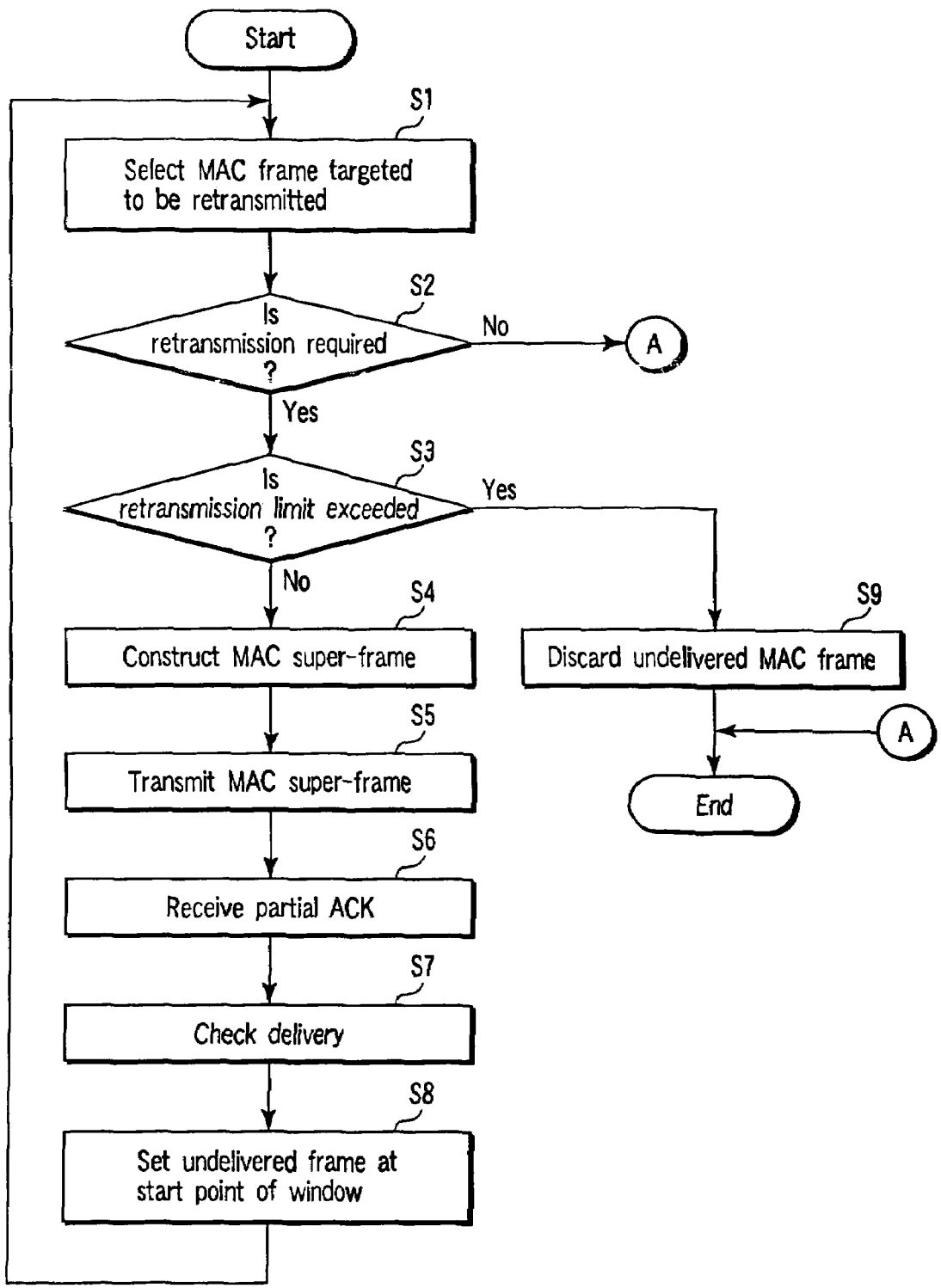
FIG. 13 is a flowchart showing operating procedures for retransmission control of the transmitting communication apparatus.

FIG. 13 is an example of a flowchart showing operating procedures for retransmission control of the transmitting communication apparatus in accordance with the embodiment. First, a MAC frame to be (re)transmitted is selected (step S1). In this step S1, from the main queue 121 storing the MAC frames specified with receiver addresses (STA1 to STA4 in this case) of a variety of communication apparatuses, the MAC frame in which the communication apparatus (STA1 in this case) of the transmission destination to be (re)transmitted in accordance with a series of the sequences is selected in a range that does not exceed full window (W_all) and the window range (W1, for example) at that time. Then, the selected MAC frames are extracted in the subsidiary queue 122 having the same size as the window in order in which the transmission events have occurred as shown in FIG. 12. Since the above extracted MAC frames are to be first (re)transmitted, the state of the subsidiary queue 122 in FIG. 12 is referred to as window W1 of FIG. 11. Subsequently, the number of windows is increased as window W2, window W3

. . . every time transmission is carried out. In the main queue 121, even in the case where a small number of MAC frames is targeted for a series of retransmission sequences such that a window size is not met, the subsidiary queue 122 may be configured. Serial sequence numbers SEQ1 to SEQ8 are assigned to the MAC frames extracted in the subsidiary queue 122. In addition, data lengths LEN1 to LEN8 of these MAC frames are stored. Further, "N" indicating that a transmission check has not completed is set as an initial state of transmission check of each MAC frame.

At this time, when the MAC frame to be retransmitted has not been extracted in the subsidiary queue 122, there is no need for continuing retransmission to at least that communication apparatus (STA1), and thus, a series of the retransmission control processes are terminated (step S2).

Next, even in the case where there exists an undelivered MAC frame, the MAC frame exceeding the retransmission limit, a series of sequences for retransmission to the communication apparatus are canceled (step S3). At this time, the undelivered MAC frame in the subsidiary queue 122 is discarded (step S9). Here, in the case where an undelivered MAC frame remains in the main queue, such a MAC frame is retransmitted in accordance with a series of the next retransmission sequences. The number of retransmissions defined as a limit is not limited to a specific number as described previously, the defined limit may be properly selected according to a communication party or a communication medium state.

Next, the MAC frames are taken out in order from the beginning of the subsidiary queue 122 to construct a MAC super-frame header and a MAC super-frame payload (step S4). Then, such a MAC super-frame is transmitted to a destined communication apparatus (STA1 in this case) (step S5). In this manner, the destined communication apparatus receives the MAC super-frame and transmits a partial ACK to the MAC super-frame. The transmitting communication apparatus receives this partial ACK from the destined communication apparatus (step S6).

Next, in step S7, it is checked whether or not each of the MAC frames in the subsidiary queue 122 has been transmitted, i.e., whether or not transmission of the MAC frames has been received in the destined communication apparatus, based on the partial ACK bit map 91 in the partial ACK frame. Based on the check result, a transmission check state in the subsidiary queue 122 is updated. At this time, the bits of the bit map 91 and the sequence number corresponding to the position in the subsidiary queue 122 are stored so that their alignments correspond to each other, and are configured so that their mutual correspondence can be easily identified. In the example shown in FIG. 1, only the MAC frames of SEQ3 and SEQ5 are still set to "N", which indicates that no transmission has been checked, i.e., which indicates that the frames have not been transmitted correctly. The Mac frames other than those of SEQ3 and SEQ5 are set to "Y", which indicates that a transmission has been checked (RX1). In this manner, transmission check information on each of the MAC frames indicated in the partial ACK bit map 91 included in the partial ACK is associated with a MAC frame position of the subsidiary queue 122 which corresponds to the transmitted MAC super-frame payload, whereby the transmission check information can be easily determined.

In step S8, the lowest sequence number of an undelivered frame (for example, SEQ3 in RX1) is determined as a start point of window. This start point corresponds to a start point of window W2 in transmission (TX2) for a second retransmission. By moving the start point, it becomes possible to discard MAC frames before a sequence number (SEQ3 in TX1) without a first transmission check from the lowest sequence number (SEQ1 in TX1) in the subsidiary queue 122. In comparison with window W1, a space for two window MAC frames is provided. In addition, it becomes possible to easily determine an excess of the retransmission limit in the previous step S3 by grasping a position of the start point and the end point of this window. For example, if the start point of the window after retransmitted by the retransmission limit does not exceed SEQ8 assigned to the last MAC frame (i.e. the end point) of window W1, it is possible to determine that at least one undelivered MAC frame exceeds the retransmission limit.

When the start point of the window is newly set in step S8, the current step reverts to step S1 again in which two MAC frames having the same receiver address STA1 are sequentially added to the tail of the subsidiary queue 122 from the main queue 121, and new sequence numbers SEQ9, SEQ19 are assigned. At this time, data lengths LEN9 and LEN10 of the added two Mac frames are stored, and a transmission check state is set to "N". The subsidiary queue 122 is updated in this manner.

That is, in step S1, referring to the subsidiary queue 122 updated in step S8, the MAC frames whose transmission check state is set to "N" follows the stored data length LEN, and 0 is set for the MAC frames whose transmission check state is set to "Y". Then, in accordance with step S4, the MAC super-frame header and the MAC frames whose transmission check state is set to "N" are selectively taken out in order from the beginning of the subsidiary queue 122 on the basis of the information of the subsidiary queue 122. Then, a MAC super-frame payload is constructed, and a MAC super-frame to be retransmitted next is completed.

Then, in step S5, second transmission (TX2) is executed, and then, the above-described operation is repeated (TX3 or subsequent).

A beacon has a higher priority of transmission than an ordinary data frame, and thus, there is a possibility that an interrupt occurs with transmission of a series of MAC frames as described above. When discontinuity occurs with the sequence numbers in such a case, a series of the past retransmission sequences are terminated before such discontinuity occurs, whereby another series of retransmission sequences may be started.

Figure 14:
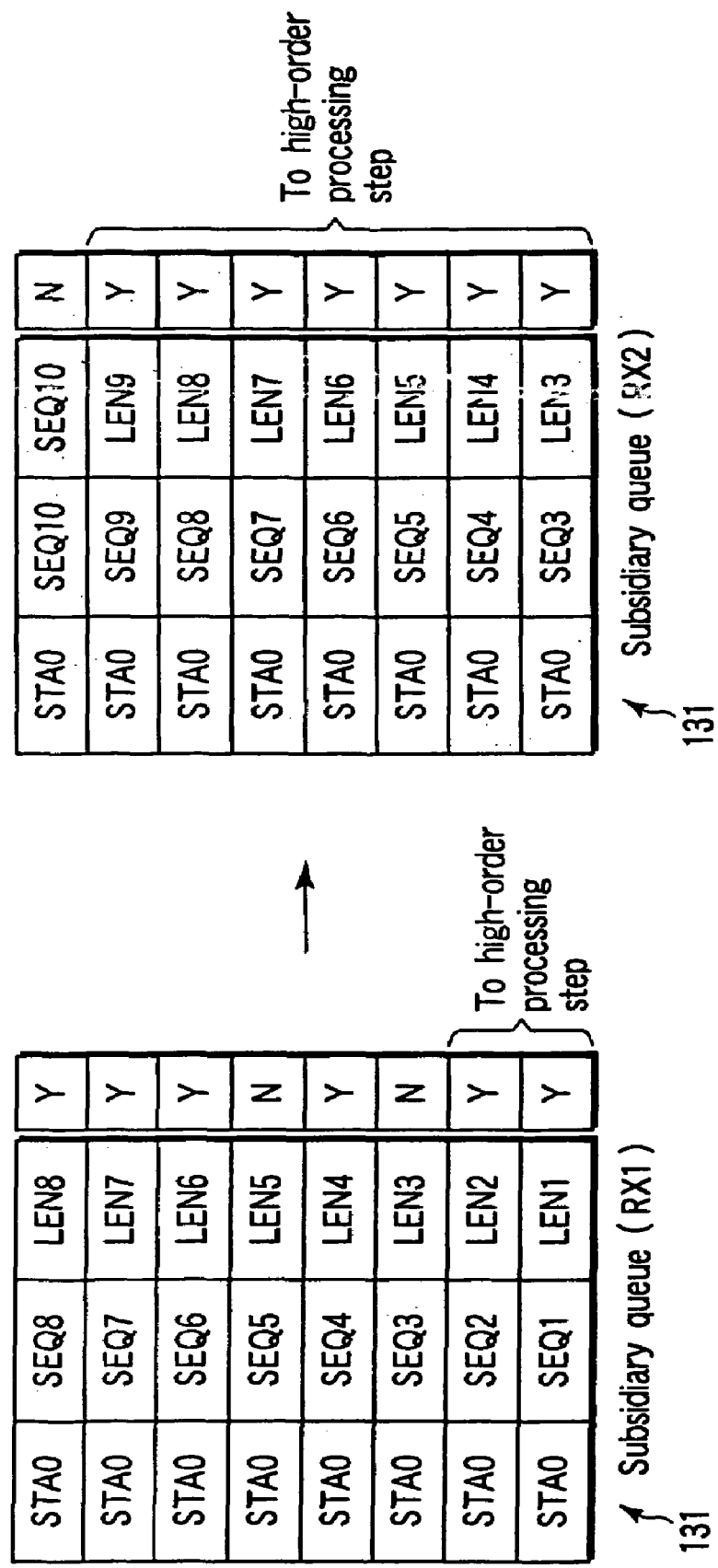
FIG. 14 is a view showing a subsidiary queue for use in a receiving communication apparatus.
Figure 15:
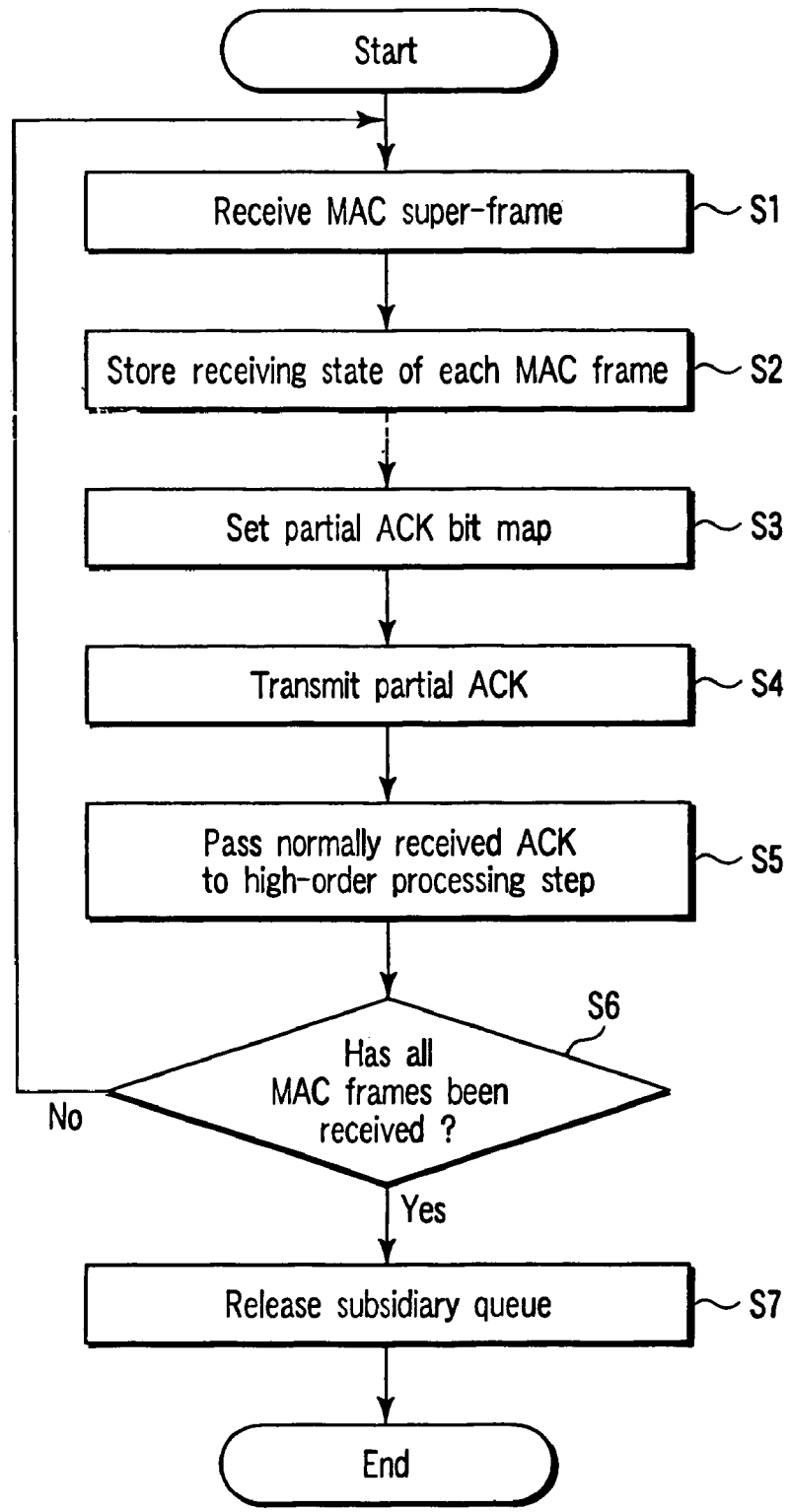
FIG. 15 is a flowchart showing operating procedures of the receiving communication apparatus.

On the other hand, FIG. 14 is a view showing a subsidiary queue for use in the receiving communication apparatus, and FIG. 15 is a flowchart showing operating procedures in the receiving communication apparatus.

In step S1, a MAC super-frame is received. A data length of each MAC frame is obtained from a MAC super-frame header and a sequence number is obtained from a MAC header of each MAC frame. Even if an error occurs with any MAC frame in the MAC super-frame, the values of the sequence numbers are sequentially assigned including MPDUs with zero length. Thus, the sequence numbers of all the MAC frames in the MAC super-frame can be obtained based on the sequence numbers of other MAC frames which has been received successfully. Further, a transmission source address (a transmitter address), i.e., a MAC address (STA0 in this case) of the transmitting communication apparatus is also stored.

In an example of FIG. 11, all the MAC frames other than those of SEQ3 and SEQ5 have been normally received, and thus, a receiving state is stored as is (step S2). That is, the receiving states of SEQ3 and SEQ5 is set to "N", and other MAC frames are set to "Y".

Next, the partial ACK bit map 91 is constructed so as to reflect this receiving state (step S3), and a partial ACK is transmitted to the transmission communication apparatus (step S4).

As shown in FIG. 14, a processing cost associated with ACK generation can be reduced by constructing the partial ACK bit map 91 which corresponds to an arrangement of MAC frames included in the received MAC super-frame payload.

Then, the MAC frames from the lowest sequence number (SEQ1 in this case) to a sequence number immediately preceding a first receiving state "N" (SEQ3 in this case) are taken out from the subsidiary queue 131, and these frames are passed to the upper layer processing step (step S5).

Next, it is determined whether or not all the MAC frames in the subsidiary queue 131 have been successfully received (step S6). When the receiving state of all the MAC frames in the subsidiary queue 131 is set to "Y", all of these received MAC frames are taken out from the subsidiary queue 131, and the subsidiary queue is emptied. Therefore, this subsidiary queue 131 assigned to STA0 is released and terminated (step S7). On the other hand, in the case where any MAC frame in the subsidiary queue 131 has not been received, processing reverts to step S1. In second receiving (RX2), SEQ3 to SEQ9 are taken out, and passed to the upper layer processing step. Subsequently, the processing of steps S1 to S6 is repeated with respect to receiving third to fifth MAC super-frames.

Even if any MAC frame in the subsidiary queue 131 has not been received, if a state in which no MAC super-frame is received from the transmitting communication apparatus STA0 continues for a predetermined period of time, all the MAC frames retained in the subsidiary queue 131 are passed to the upper layer processing step such as link layer processing. In addition, in the case where the sequence number of the first MAC frame in the MAC super-frame from the transmitting communication apparatus STA0 is greater than that of the MAC frame waiting for retransmission in the receiving state "N", all the MAC frames in the subsidiary queue 131 are passed to the high-order processing step, and a new subsidiary queue is generated for a new MAC super-frame. In these cases, a loss of a MAC frame occurs.

When the receiving communication apparatus constructs a partial ACK bit map, only a receiving state of MAC frames included in the immediately preceding MAC super-frame may be indicated without referring to a history of the past receiving states. Because a partial ACK has to be constructed and sent within a SIFS time constraint and the requirement of retrieving the past history in this time constraint tends to increase circuit size and complexity, this simplifies implementation of a receiving communication apparatus. In this case, when the transmitting communication apparatus has received the partial ACK, the MAC frame whose transmission has been checked is deleted from the subsidiary queue or a mark indicating that transmission has been checked is assigned to the corresponding MAC frame, whereby the history of the transmission state may be stored.

Further, when the receiving communication apparatus returns the partial ACK, the information contained in the physical layer may be fed back to the transmitting communication apparatus in a form such that it is properly summarized, by using a PHY feedback information (PHY Feedback Information) field 92 of FIG. 9. The transmitting communication apparatus can switch a transmission scheme for the physical layer (such as modulation scheme, encoding rate, or number of independent streams of MIMO) based on both of a transmission state in units of MAC frames expressed by partial ACK bit map 91 and the PHY feedback information 92.

For example, in the case where all the MAC frames have been received successfully, it is possible to check whether or not a margin of the physical layer is large. If the margin is large, it is possible to change a current transmission scheme to a higher data rate transmission scheme. If an error occurs with several MAC frames, it is possible to determine whether to reduce a modulation scheme level or encoding rate to save the margin or whether to reduce the number of MIMO independent streams. By doing this, the information required for controlling communication in the physical layer can be transmitted while transmission and reception of the MAC frame are carried out.

Fourth Embodiment

The present embodiment describes a case in which it is permitted that a partial ACK frame in addition to data frames is included as a MAC frame configuring a MAC super-frame. Further improvement of a throughput can be expected by piggybacking a partial ACK in the MAC super-frame.

Figure 16:
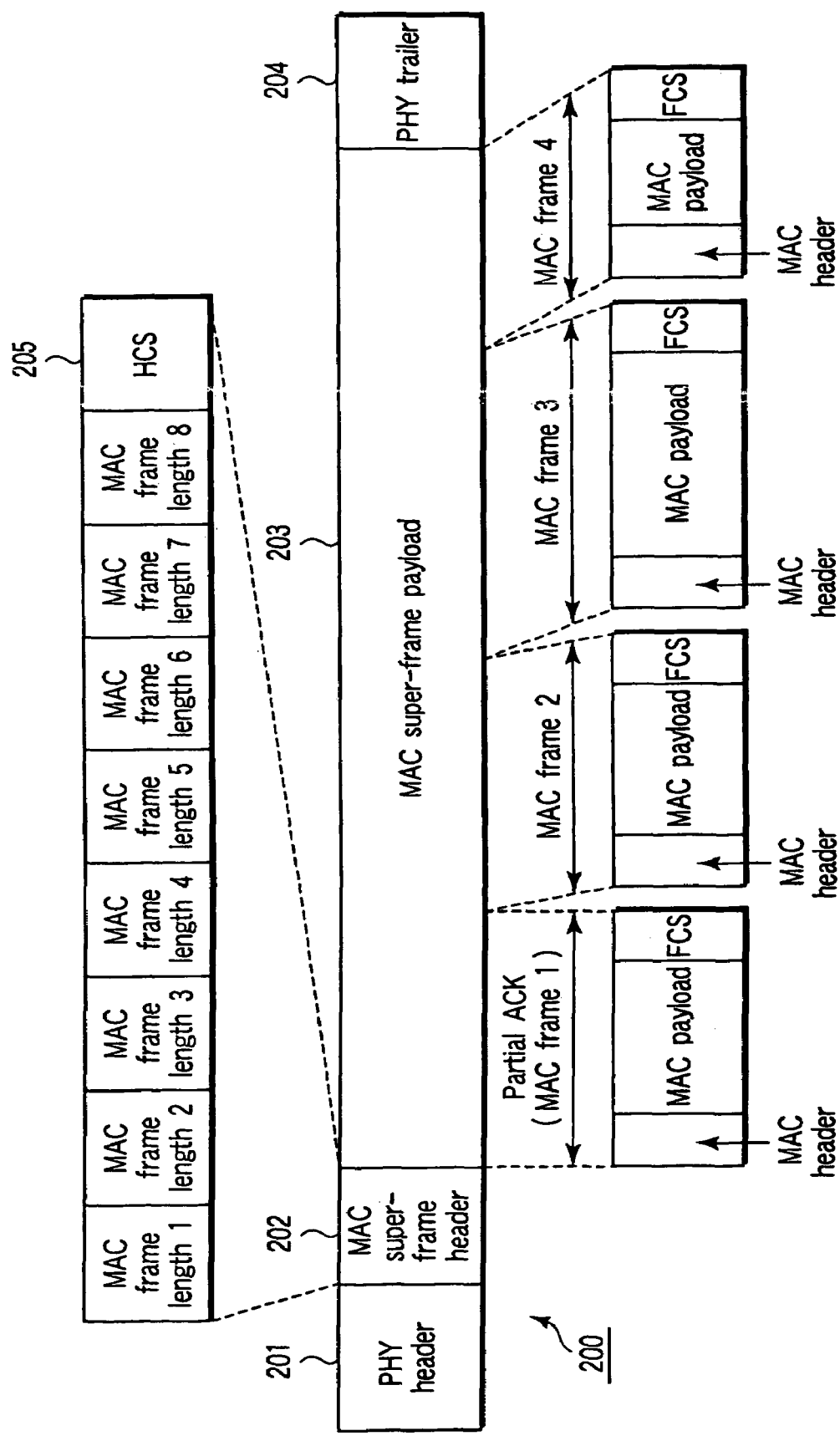
FIG. 16 is a view showing an example of a frame format for use in a communication apparatus according to a fourth embodiment of the present invention.

FIG. 16 shows a frame configuration in the case where a partial ACK frame is permitted as a first MAC frame of the MAC super-frame payload 203. In addition, a carrier sense state in this case is shown in FIG. 17. Now, a difference from the embodiments described previously will be primarily described here.

The partial ACK frame of FIG. 16 includes only address 1, namely only an address of a receiving communication apparatus, and does not include address 2 to address 4. Address 1 and a value of a duration field are information sufficiently required to carry out virtual carrier sensing of a MAC layer.

In the present embodiment, when a transmission privilege utilizing a communication medium has been allocated, a sequence can be configured such that a plurality of MAC super-frames and the last partial ACK are sequentially transmitted and received at a SIFS interval (namely, without new procedures for allocating or contending for a transmission privilege).

FIG. 17 shows an example of a carrier sense state for defining a value of a duration field in the communication apparatus according to the present embodiment. FIG. 17 shows an example in which a series of communication processes terminate when three frames are exchanged. A sequence may be further continued. A maximum TXOP (Transmission Opportunities) of FIG. 17 indicates a maximum time permitted for one sequence. The TXOP is notified to each communication apparatus as a value common to all the communication apparatuses by means of beacon, for example. Alternatively, it is considered that a communication apparatus (e.g. an access point) for concentrically managing a use privilege of a communication medium dynamically assigns a transmission privilege having individual TXOP values for individual communication apparatuses.

When a value of a duration which corresponds to a sum of the SIFS and partial ACK frame transmission time is set such that the communication apparatus occupies a communication medium during transmission, it must be considered that it is not always evident as to whether a partial ACK included in a response is transmitted by a first type PHY frame or is transmitted by a second type PHY frame. In general, in the case where no data frame is to be transmitted by a counterpart communication apparatus, or alternatively, in the case where the data frame is not included in the TXOP, although an attempt is made to include the data frame, transmission is carried out in the first type PHY frame. In the other case, a partial ACK is transmitted in accordance with the second type PHY frame. Using the first PHY frame reduces a transmission time of a frame including a partial ACK more significantly because the PHY header of the second type PHY frame is longer than that of the first type PHY frame; a data length of the partial ACK itself is shorter; and a time interval required for transmitting this partial ACK does not depend on a transmission rate so much. When a value of the longer header is set as a duration value, a communication medium is unnecessarily occupied, and a wasteful time which is not utilized in another communication process is likely to occur. Thus, a value of the shorter header is set as a duration value.

In FIG. 17, a value obtained when it is assumed that a partial ACK is transmitted in accordance with the first type PHY frame is set as duration values of MAC frame 1 and MAC frame 2. In actuality, a case in which a partial ACK (corresponding to MAC frame 3) has been transmitted in accordance with the second type frame is indicated. Although duration 1 is indicated as a value which terminates before completion of partial ACK transmission, the communication apparatus 3 and communication apparatus 4 each detect a PHY busy state in a duration of NAV set in accordance with duration 1. While the PHY busy state of the communication apparatus 3 continues, NAV of the communication apparatus 3 is updated by a value of duration 2 included in the partial ACK (MAC frame 3) and MAC frame 4. Thus, the state of carrier sensing of the communication apparatus 3 does not cause a problem for a virtual medium occupation duration of the communication. With respect to the communication apparatus 4 as well, after the receiving of the second type. PHY frame including the partial ACK has completed, the EIFS duration is restarted. Therefore, no problem occurs with the carrier sense state of the communication apparatus 4. Accordingly, even if a duration value is calculated assuming that a partial ACK is transmitted in the first type PHY frame, it is found that no problem occurs with respective communication apparatuses on the communication. Therefore, with such a configuration according to the present embodiment, the partial ACK can be efficiently transmitted while one communication apparatus coexists with another communication apparatus.

In the case where a partial ACK included in the MAC super-frame has not been correctly received, this partial ACK may not be retransmitted. In this case, recovery may be carried out similarly in the case where a partial ACK without aggregation has been lost. Namely, after it is detected that a partial ACK has not been successfully received, a MAC super-frame identical to that transmitted immediately before including that partial ACK is retransmitted.

Fifth Embodiment

The present embodiment relates to a case of aggregating (integrating) a plurality of MPDUs generated when one MSDU has been fragmented.

FIG. 18 shows an example of a MAC super-frame header in accordance with the present embodiment. In addition to each MAC frame length (MAC Frame length), a fragment number of each MAC frame is included. The handling of a fragment number will be described below.

It is presumed that MPDU configuring one MSDU does not encompass another MAC super-frame. Sequence numbers are assigned so as to be sequential values relevant to MSDU. Namely, the MPDU generated from the same MSDU has the same sequence number. A fragment number is a value representing a relative position of the MPDU in MSDU, and is generally assigned as a continuous value beginning with 0. Finally, the sequence number and fragment number, and the relative position of each MAC frame in a series of transmission/retransmission processes for MAC super-frames are decided at the time of transmission. Accordingly, the transmitting communication apparatus can specify a corresponding MAC frame by using only partial ACK bit map information, and can make retransmission control by simple expansion in the scheme described previously.

Alternatively, retransmission control according to the present embodiment can be functioned similarly even by indicating the first and last MPDU of MSDU (either of them may be implicitly indicated) without explicitly indicating a fragment number in a MAC super-frame header.

Sixth Embodiment

At a MAC super-frame header according to the present embodiment, the MAC super-frame header itself has the same format as the MPDU. A receiving communication apparatus can carry out branching of processing of an ordinary MAC frame and a MAC super-frame by only processing of a MAC layer without receiving information from a physical layer.

Figure 19:
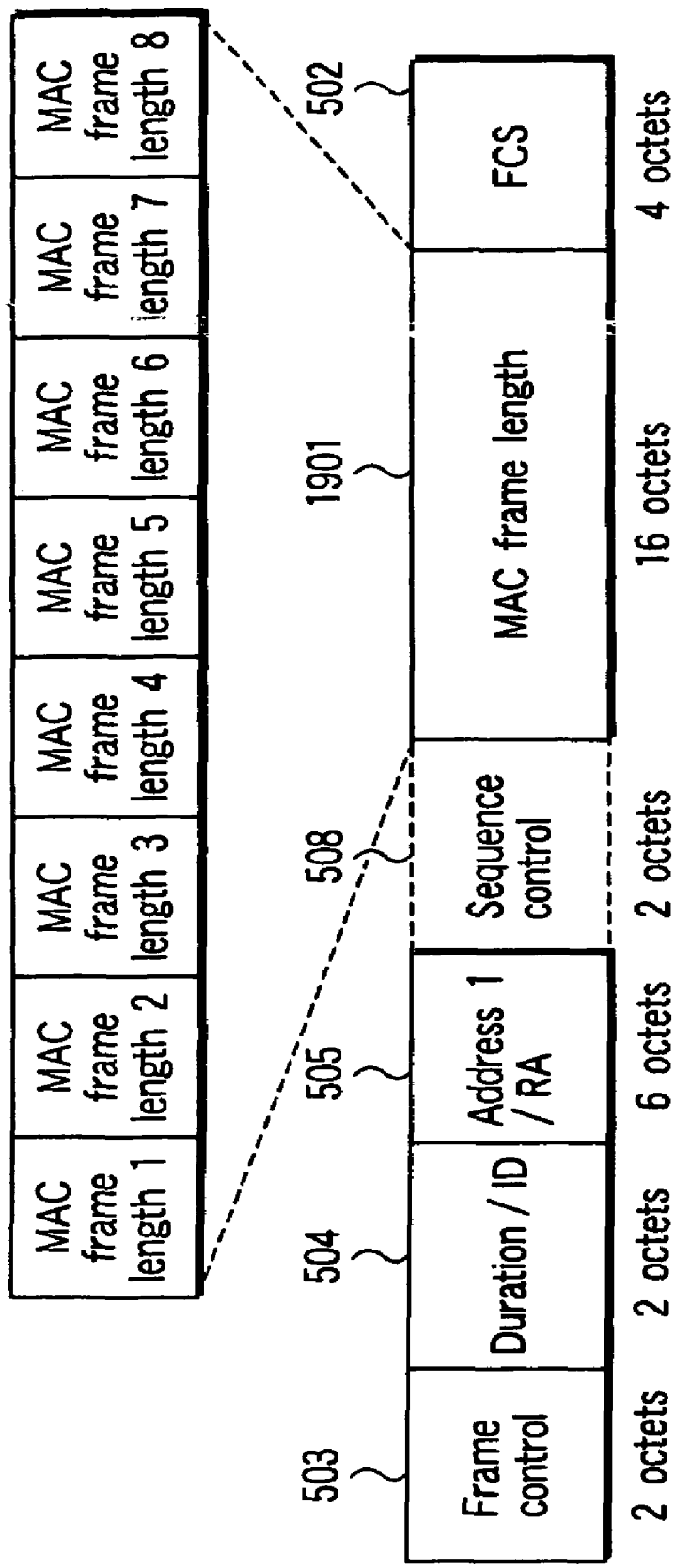
FIG. 19 is a view showing an example of a frame format for use in a communication apparatus according to a sixth embodiment of the preset invention.

FIG. 19 shows an example of a MAC super-frame header 1900 which has the same format as the MPDU. For example, a value indicating a MAC super-frame header is newly defined and assigned in a Type/Sub-type region included in a frame control field. The MAC layer of the receiving communication apparatus determines whether to carry out processing of the MAC super-frame subsequently or whether to carry out processing an ordinary MAC frame in accordance with the value. The value of the duration 504 is set in conformance with a method for calculating a value of another MAC frame included in the MAC super-frame. The value of field 505 of address 1 (Receiver Address) is set to be identical to address 1 of another MAC frame included in the MAC super-frame. In this manner, an address for specifying the receiving communication apparatus is set in field 505 of address 1.

The MAC super-frame header 1900 is neither fragmented nor retransmitted, and thus, the value of sequence control field 508 does not have meaning in particular. Therefore, it is more preferable that type of the MAC super-frame is assigned as a control frame because this sequence control field 508 is emitted.

When type of defined as Management or Data, it is necessary to have the sequence control field 508. This value need to be handled so as to obtain coincidence with retransmission control of the embodiment according to the present invention. In the existing communication, it is assumed that the sequence number of the MAC frame targeted for retransmission takes a continuous value in a series of retransmission controls for the MAC super-frame, for example. Thus, in the case where a discontinuous value is set for a sequence number, a series of retransmission controls for the MAC super-frame are temporarily terminated, making it necessary to start retransmission control using another sequence. Thus, it is necessary to ensure that sequence number discontinuity does not occur or to continue a series of retransmission controls even if the sequence number becomes discontinuous. As one example for solving this problem, there is a method for, when window control is made during retransmission as shown in another embodiment of the present embodiment, it is possible for a transmission communication apparatus to find the maximum sequence number which can be assigned to the MAC frame targeted for retransmission in a series of retransmission controls in advance. Thus, sequentially allocating the sequence numbers of a value, which exceeds the maximum value of sequence number, to MAC super-frame MPDSs solves the problem. Further, it is necessary to assign a continuous value to this value including a MAC frame targeted for retransmission. However, there can be provided a method for, when retransmission control is made, ignoring the sequence number of the MAC frame targeted for retransmission, thereby controlling retransmission so as to permit discontinuity. A retransmission control method which mainly depends on relative positions of MAC frames in a sequence of MAC super-frames and not entirely relies on sequence numbers of MAC frames is an example of this method.

A length of each MAC frame included in the MAC super-frame is set at a portion 1901 corresponding to a payload shown in FIG. 19. As described in another embodiment of the present invention, a fragment number for coping with fragmentation may be included in the payload 1901.

In addition, FCS 502 corresponds to the HCS 205 shown in FIG. 2. In the case of the present embodiment as well, using the FCS 502 may be handled in the same manner as in normal MPDU. For example, a CRC value calculated relevant to the whole MAC super-frame header is set in the FCS 502. In the case where it is recognized that the MC super-frame header 1900 is destroyed by the FCS 502 associated with the MAC super-frame header 1900, this recognition is handled in the same manner as in the case where an error has been detected by the HCS 205. The receiving communication apparatus having detected this error discards the whole MAC super-frame.

Seventh Embodiment

In the present embodiment, the MAC super-frame header which can be handled in the same manner as a partial ACK and the MAC frame shown in another embodiment of the present invention is stored in the same MAC super-frame.

Figure 20:
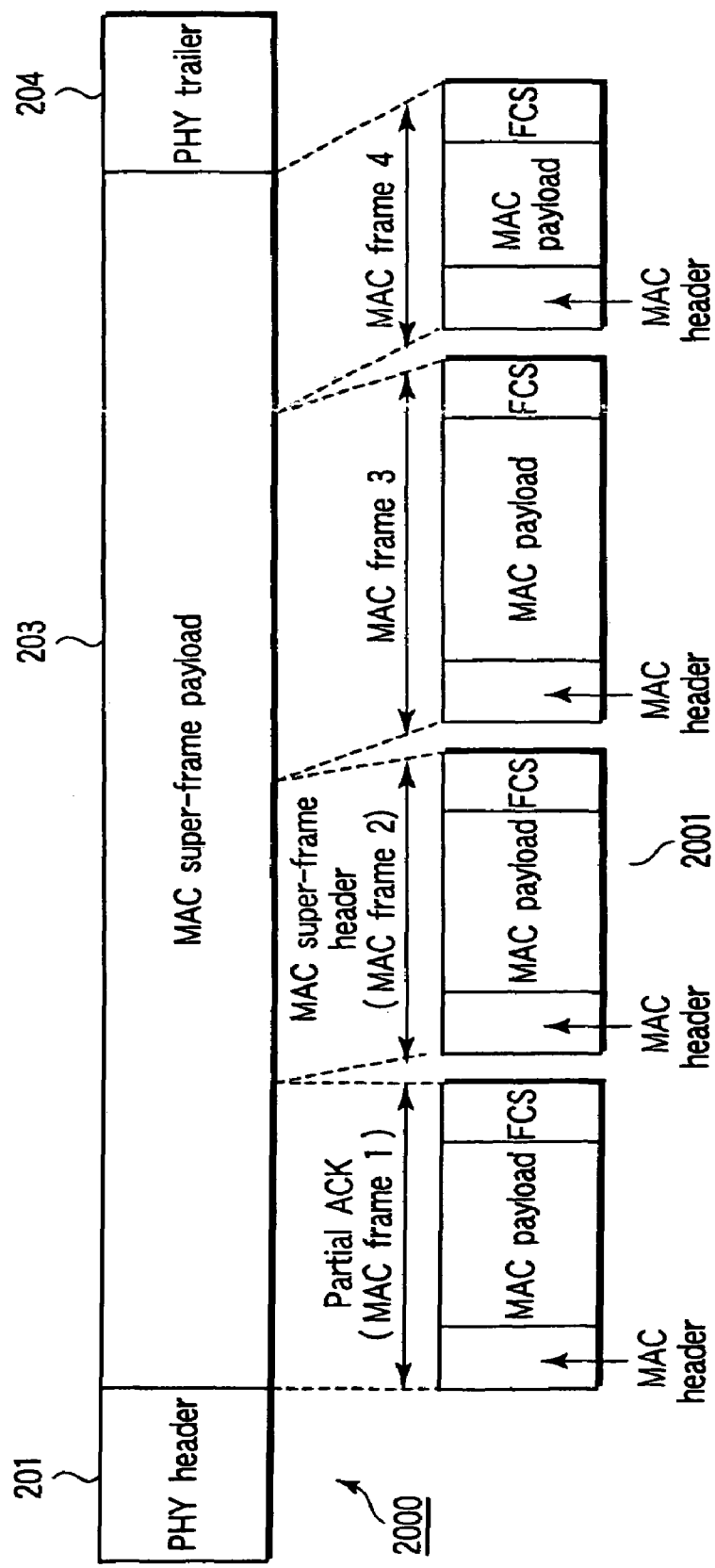
FIG. 20 is a view showing an example of a frame format for use in a communication apparatus according to a seventh embodiment of the preset invention.

FIG. 20 shows an example of a format of a MAC super-frame 200 in accordance with the present embodiment. Here, a partial ACK frame is first arranged at the head of the MAC super-frame payload 203, and then, a MAC frame of the MAC super-frame header is set in order. Essential information included in a MAC super-frame header 2001 corresponds to a length of each MAC frame required for the receiving side to recognize a boundary of respective MAC frame in the MAC super-frame payload 203. A length of a partial ACK can be basically set at a fixed length. Thus, even if a partial ACK is placed at the beginning, no problem occurs with processing in the receiving communication apparatus. There is a high possibility that, even if the length of the partial ACK is placed at the beginning, whereby the preceding ACK can be received without any problem even if the MAC super-frame header is destroyed. When a partial ACK is received without any problem, since a carrier sense state of the MAC layer is correctly set, second required retransmission can be carried out without a waiting time for error recovery. In this manner, the waiting time for error recovery can be eliminated, whereby improvement of a communication throughput can be expected.

In contrast, even if a positional relationship of the partial ACK and the MAC super-frame header 2001 is reversed in the MAC super-frame payload 203, if the MAC super-frame header 2001 is set at a fixed length, there is a possibility that, even if the preceding MAC super-frame header 2001 is destroyed, the subsequent existing partial ACK can be correctly received. A similar advantageous effect can be attained if carrier sensing and retransmission control are made based on the partial ACK similarly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus, comprising:
a physical frame construction device configured to construct a single physical frame containing a physical header, length information, a first check sequence, and a plurality of MAC frames, the length information representing lengths of the plurality of MAC frames, the first check sequence being for detecting an error which may occur in the length information, each of the plurality of MAC frames including a second check sequence for detecting an error which may occur in each of the plurality of MAC frames; and
a transmission device configured to transmit the physical frame to a destination communication apparatus,
wherein the physical header including a first header for a first protocol and a second header for a second protocol, the second header following the first header;
the first header includes a length field for describing first information representing a length of the plurality of MAC frames, and includes a rate field for describing second information representing a transmission rate of the plurality of MAC frames;
the first header is decodable by a first communication apparatus that supports the first protocol and a second communication apparatus that supports the second protocol; and
the second header is decodable by the second communication apparatus.

2. The apparatus according to claim 1, further comprising:
a reception device configured to receive an acknowledgement frame as a response to reception of at least one of a plurality of the MAC frames in the physical frame, after the destination communication apparatus receives the physical frame and a Short IFS (SIFS) period elapses.

3. The apparatus according to claim 2, further comprising:
a checking device configured to check whether each of the plurality of the MAC frames has been received correctly, based on the acknowledgement frame received by the reception device.

4. The apparatus according to claim 2,
wherein sequence numbers are assigned to the MAC frames included in the physical frame, and wherein the acknowledgement frame includes an acknowledgement bit map which includes values of one and zero corresponding to an arrangement of the sequence numbers, the values each indicating whether each of the MAC frames has been received correctly or not.

5. The apparatus according to claim 1, wherein each of the MAC frames further contains a duration field, and values of the duration fields of the MAC frames are identical.

6. The apparatus according to claim 1, wherein the physical frame construction device sets the length information as zero for a MAC frame in the physical frame.

7. The apparatus according to claim 1, further comprising an antenna, and
wherein the transmission device transmits the physical frame through the antenna to a destination communication apparatus.

8. A communication apparatus, comprising:
a physical frame reception device configured to receive a single physical frame containing a physical header, length information, a first check sequence, and a plurality of MAC frames, the length information representing lengths of the plurality of MAC frames, the first check sequence being for detecting an error which may occur in the length information, each of the plurality of MAC frames including a second check sequence for detecting an error which may occur in each of the plurality of MAC frames;

a generation device configured to generate an acknowledgement frame in which MAC frames of the received physical frame are specified to have been received correctly, if no error has been detected on the length information according to the first check sequence and no error has been detected on each of the MAC frames according to the second check sequence corresponding thereto; and a transmission device configured to transmit the acknowledgement frame as a response to reception of at least one of the plurality of the MAC frames in the physical frame, after said physical frame is received and a Short IFS (SIFS) period elapses, wherein the physical header including a first header for a first protocol and a second header for a second protocol, the second header following the first header;

the first header includes a length field for describing first information representing a length of the plurality of MAC frames, and includes a rate field for describing second information representing a transmission rate of the plurality of MAC frames;

the first header is decodable by a first communication apparatus that supports the first protocol and a second communication apparatus that supports the second protocol; and the second header is decodable by the second communication apparatus.

9. The apparatus according to claim 8, wherein the acknowledgement frame contains a receiving state indicating whether each data frame of the MAC frames included in the physical frame received by the reception device has been received correctly.

10. The apparatus according to claim 9, wherein
the physical frame reception device further receives a physical frame retransmitted based on the receiving state, the physical frame including a MAC frame which was not received correctly, and wherein the transmission device transmits, without referring to a history of past receiving states, a new acknowledgement frame which contains a receiving state indicating only whether a MAC frame included in the retransmitted physical frame has been received correctly.

11. The apparatus according to claim 9, wherein
the physical frame reception device further receives a physical frame retransmitted based on the receiving state, the physical frame including a MAC frame which was not received correctly, and wherein the transmission device transmits a new acknowledgement frame which contains an updated receiving state that is updated from a previous receiving state by a receiving state indicating whether a MAC frame included in the retransmitted physical frame has been received correctly.

12. The apparatus according to claim 8, wherein the plurality of the MAC frames in the physical frame include at least data frames,
the physical frame reception device further receives a physical frame retransmitted based on a receiving state, the physical frame including data frames which were not received correctly, and wherein the construction device constructs a new acknowledgement bit map which is updated from a previous acknowledgement bit map by one and zero values each indicating whether each of the MAC frames contained in the retransmitted physical frame have been received correctly or not.

13. The apparatus according to claim 8, wherein the plurality of the MAC frames in the physical frame include at least data frames, and the apparatus further comprising:
a buffer configured to temporarily store, of the MAC frames contained in the received physical frame, a MAC frame which has been received correctly, so that the MAC frame can be read out in order of sequence numbers, wherein the sequence numbers are assigned to the MAC frames included in the physical frame;

a transferring device configured to read from the buffered MAC frames having sequence numbers, and transfer the MAC frames to an upper layer processing, based on a comparison between the sequence numbers of the buffered data frames and sequence numbers of MAC frames contained in a physical frame newly received; and a deletion device configured to delete the MAC frames transferred from said buffer.

14. The apparatus according to claim 8, wherein each of the MAC frames further contains a duration field, and values of the duration fields of the MAC frames are identical.

15. The apparatus according to claim 14, further comprising a recognizing device configured to recognize whether reception or transmission is necessary from any one of the MAC frames correctly received within the physical frame, and when the recognizing device recognizes that reception or transmission is not necessary, a power saving operation is started until end of duration which is set as a value in the duration field of the correctly received MAC frame.

16. The apparatus according to claim 8, further comprising a physical frame construction device configured to construct another physical frame containing length information and a plurality of MAC frames, the length information of the another physical frame representing lengths of the MAC frames and including a first check sequence, and each of the MAC frames of the another physical frame including a second check sequence,
wherein:
the plurality of MAC frames within the another physical frame further contains an acknowledgement frame and a plurality of data frames; and
the transmission device transmits the another physical frame without new procedures for contending for a transmission privilege.

17. The apparatus according to claim 8, further comprising an antenna, and
wherein the transmission device transmits the acknowledgement frame through the antenna.

* * * * *

UNITED STATES PATENT AND TRADEMARK OFFICE
CERTIFICATE OF CORRECTION

| | |
|---|---|
| PATENT NO. | : 7,706,408 B2 |
| APPLICATION NO. | : 11/527528 |
| DATED | : April 27, 2010 |
| INVENTOR(S) | : Takagi et al. |

It is certified that error appears in the above-identified patent and that said Letters Patent is hereby corrected as shown below:

Title page, Item (57), in the Abstract, line 6, change "frame" to --frames--.

Signed and Sealed this

Sixth Day of July, 2010

David J. Kappos
*Director of the United States Patent and Trademark Office*